US009641911B2

(12) United States Patent
Lin

(10) Patent No.: US 9,641,911 B2
(45) Date of Patent: May 2, 2017

(54) METHOD AND SYSTEM OF SEARCHING AND COLLATING VIDEO FILES, ESTABLISHING SEMANTIC GROUP, AND PROGRAM STORAGE MEDIUM THEREFOR

(71) Applicant: Industrial Technology Research Institute, Hsinchu (TW)

(72) Inventor: Guan-Rong Lin, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 153 days.

(21) Appl. No.: 14/259,169

(22) Filed: Apr. 23, 2014

(65) Prior Publication Data

US 2015/0169542 A1    Jun. 18, 2015

(30) Foreign Application Priority Data

Dec. 13, 2013 (TW) ............................. 102146242 A

(51) Int. Cl.
*H04N 7/173* (2011.01)
*H04N 7/16* (2011.01)
(Continued)

(52) U.S. Cl.
CPC ..... *H04N 21/8405* (2013.01); *G06F 17/2785* (2013.01); *G06F 17/30781* (2013.01);
(Continued)

(58) Field of Classification Search
CPC ........... H04N 5/44543; H04N 21/2428; H04N 21/4345; H04N 21/8133; H04N 21/8405; G06F 17/2785
(Continued)

(56) References Cited

U.S. PATENT DOCUMENTS 6,311,194 B1  10/2001 Sheth et al.
6,901,366 B1   5/2005 Kuhn et al.
(Continued)

FOREIGN PATENT DOCUMENTS

CN       102244817      11/2011
TW       M340527         9/2008
(Continued)

OTHER PUBLICATIONS

Cho et al., "A TV Program-Oriented User Generated Content Service with Seamless Video Reconstruction Ranking in Cloud Networks," Globecom Workshops (GC Wkshps), IEEE, Dec. 5-9, 2011, pp. 29-33.

(Continued)

*Primary Examiner* — Pankaj Kumar
*Assistant Examiner* — Franklin Andramuno
(74) *Attorney, Agent, or Firm* — Jianq Chyun IP Office

(57) ABSTRACT

The disclosure introduces a method and a system of searching and collating video files, a method for establishing a semantic group, and a program storage medium therefor. In the method of searching and collating video files, program information in an electronic program guide (EPG) may be used for searching matching candidate video files, and titles of the candidate video files are reformatted or amended for selection. Some of the candidate video files are integrated to be a complete program, and these candidate video files may be grouped into a channel set for users to watch.

25 Claims, 17 Drawing Sheets

(51) Int. Cl.
| | |
|---|---|
| H04N 21/8405 | (2011.01) |
| H04N 5/445 | (2011.01) |
| H04N 21/482 | (2011.01) |
| H04N 21/81 | (2011.01) |
| G06F 17/27 | (2006.01) |
| G06F 17/30 | (2006.01) |
| H04N 21/434 | (2011.01) |

(52) U.S. Cl.
CPC ..... H04N 5/44543 (2013.01); H04N 21/4828 (2013.01); H04N 21/8133 (2013.01); H04N 21/4345 (2013.01)

(58) Field of Classification Search
USPC .......................................... 725/132, 135, 140
See application file for complete search history.

(56) References Cited

U.S. PATENT DOCUMENTS

| | | | |
|---|---|---|---|
| 7,421,455 B2 | 9/2008 | Hua et al. | |
| 8,132,220 B2 | 3/2012 | Merlin | |
| 8,515,933 B2 | 8/2013 | Tu et al. | |
| 8,533,761 B1* | 9/2013 | Sahami | H04N 5/44543 725/51 |
| 2004/0125877 A1* | 7/2004 | Chang | G06F 17/30787 375/240.28 |
| 2006/0112082 A1 | 5/2006 | Platt et al. | |
| 2006/0239591 A1 | 10/2006 | Kim et al. | |
| 2007/0208771 A1 | 9/2007 | Platt | |
| 2008/0288438 A1* | 11/2008 | Stauder | G06F 17/30044 |
| 2009/0006368 A1* | 1/2009 | Mei | G06F 17/30796 |
| 2010/0057694 A1 | 3/2010 | Kunjithapatham et al. | |
| 2011/0252065 A1* | 10/2011 | Ryu | G06F 17/3002 707/794 |
| 2011/0283324 A1* | 11/2011 | Oh | H04N 21/234336 725/53 |
| 2012/0192217 A1* | 7/2012 | Jeong | H04N 21/252 725/14 |
| 2012/0272270 A1 | 10/2012 | Boyer et al. | |
| 2013/0347013 A1* | 12/2013 | Sivaraman | H04N 21/47815 725/5 |
| 2014/0068676 A1 | 3/2014 | Lin et al. | |
| 2014/0283055 A1* | 9/2014 | Zahran | G06F 17/30707 726/23 |

FOREIGN PATENT DOCUMENTS

| | | |
|---|---|---|
| TW | 201204014 | 1/2012 |
| TW | 201224799 | 6/2012 |
| TW | 201225642 | 6/2012 |
| TW | 201225671 | 6/2012 |

OTHER PUBLICATIONS

Kim et al., "Semantic Network based Integrated Multi-Level Search System for Smart TV," Advanced Communication Technology (ICACT), 2012 14th International Conference on, Feb. 19-22, 2012, pp. 1294-1299.

Oh et al., "Time-dependent User Profiling for TV Recommendation," Cloud and Green Computing (CGC), 2012 Second International Conference on, Nov. 1-3, 2012, pp. 783-787.

Song et al., "The Algorithms of Intelligent TV programs Recommendation Based on Data Mining," Computer Science & Service System (CSSS), 2012 International Conference on, Aug. 11-13, 2012, pp. 1611-1614.

Lee et al., "Ontology-based Multimedia Contents Retrieval Framework in Smart TV Environment," Advanced Communication Technology (ICACT), 2013 15th International Conference on, Jan. 27-30, 2013, pp. 189-195.

Kim et al., "A Proposal of Semantic Multimedia Contents Retrieval Framework for Smart TV," Broadband Multimedia Systems and Broadcasting (BMSB), 2012 IEEE International Symposium on, Jun. 27-29, 2012, pp. 1-6.

"Office Action of Taiwan Counterpart Application", issued on Sep. 7, 2015, p. 1-p. 7.

* cited by examiner

FIG. 6

610
(AV version|AV actress|naked|salacious|slut|naked self|e|uniform seduction|satyr|candid|bimbo|porn|erotic|lewd|video chat|adult)

620
(soundtrack|Preview|behind the scenes|Behind the scenes|promotion|MV|Theme|Ending theme|Opening theme|preview|Soundtrack|paragraph|clip|scene|theme|background music|mp3|MP3|mp4|MP4

640
(?P<y>\d{2,4})[\_\s\|\V\-_yy](?P<md1>\d{1,2})[\.\s\|\V\-_mmdd](?P<md2>\d{1,2})[mmdd]?:
(?P<md1>\d{1,2})[\.\s\|\V\-_mmdd](?P<md2>\d{1,2})[\.\s\|\V\-_mmdd](?P<y>\d{2,4})[yy]?:
(?P<y>\d{2,4})(?P<md1>\d{2})(?P<md2>\d{2})
(?P<y>\d{2,4})[\syy](?P<md1>\d{1,2})[\syy]
(?P<y>\d{2,4})[yy]
(?P<md1>\d{1,2})[\.\s\|\V\-_mmdd](?P<md2>\d{1,2})[mmdd]?:
(?P<md1>\d{1,2})[yy]

650
[^a-zA-Z][Pp][Aa][Rr][Tt]\s*\.?\s*(?P<s1>[\d\s])+(?:[^\V\.\-_\s]|[Oo][Ff])(?P<s2>[\d\s])+
[^a-zA-Z][Pp][Aa][Rr][Tt]\s*\.?\s*(?P<s1>[\d\s])+
[^a-zA-Z][Pp][Aa][Rr][Tt]\s*\.?\s*(?P<s1>[\d\s])+
[^a-zA-Z][Pp][Tt]\s*\.?\s*(?P<s1>[\d\s])+
(?P<s1>[\d]+)\s*(?:[V]|[Oo][Ff])\s*(?P<s2>[\d]+)
(?P<s1>[\d]+)\s*(?:[\.\|\-_])[Oo][Ff](?P<s2>[\d]+)

660
(240|360|480|540|720|1080)([Pp]?)

630
Episode\s?([^Episode Part Website Episode]+)\s?[Episode]
[Ee][Pp][Ii]|[Ss][Oo][Dd][Ee]\s?\.?\s([\d\s]+)
[Ee][Pp](?:[Ii]?\s?\.?\s?([\d\s.]+)
Episode\s?([^Episode Part Website Episode]+)\s?[Website]
Episode\s?([^Episode Part Website Episode]+)\s?[Episode]

METHOD AND SYSTEM OF SEARCHING AND COLLATING VIDEO FILES, ESTABLISHING SEMANTIC GROUP, AND PROGRAM STORAGE MEDIUM THEREFOR

CROSS-REFERENCE TO RELATED APPLICATION

This application claims the priority benefit of Taiwan application serial no. 102146242, filed on Dec. 13, 2013. The entirety of the above-mentioned patent application is hereby incorporated by reference herein and made a part of this specification.

TECHNICAL FIELD

The disclosure relates to a method and a system of searching and collating video files, a method for establishing a semantic group and a program storage medium therefore.

BACKGROUND

Televisions are developed from single-way broadcasting in the past to having digital two-way interactive functions, and now, even connected TVs combined with network are also developed. Currently, for signal sources of televisions around the world, analog signals are gradually replaced by digital signals. Along with the maturity of network streaming technologies, on-line video platforms and contents are also vigorously developed. Due to having playback on demand characteristics, without limitations of time and restrictions of channel numbers by cable TV system opera, users can experience more diversity of video platforms and contents.

At present, signals of current connected TVs are transmitted in two modes, one is transmitting digital signals for the users to watch programs broadcasted by digital television stations, and the other is connecting network signals for the users to watch network videos. The digital signals and the network signals are from different signal sources, e.g., the broadcasting industry in Europe launches a hybrid broadcast broadband TV (HbbTV) service. The HbbTV service is a TV service combining the conventional TV broadcasting service and network contents, which allow users to use social network applications or any other applications for interactive TV services, such as polling, discussion, shopping and so on.

Even though the TV digital signals and network communication technologies has been available, subscribers still have to access to the televisions for video files by using computer-like operation interfaces since most of the operators merely build in software for network video platform on the televisions. Accordingly, TV programs have not yet been actually integrated into network videos. The software for video platforms (e.g., YouTube, Tudou, Youku, and so on) which are built in the connected TVs generally provide a searching function, and when a specific video file is to be watched on a video platform, at least one keyword has to be manually input for searching. The manually input operation is less convenient and may cause further inconvenience resulted from poor searching results to users if the least one keyword is unclearly given.

SUMMARY

The disclosure introduces a method of searching and collating video files, including the following steps. A semantic keyword is retrieved according to video information. The semantic keyword includes title infatuation. A plurality of candidate video files is searched according to the semantic keyword in a video platform and obtained. Each of the candidate video files is parsed by using a video semantic searching and collating process, such that a plurality of matched video files is selected and grouped. The grouped matched video files are gathered in at least one video channel set.

The disclosure introduces a system of searching and collating video files, including a retrieving unit, a searching unit and a processing unit. The retrieving unit retrieves a semantic keyword according to video information, and the semantic keyword includes title information. The searching unit searches according to the semantic keyword in a video platform and obtains a plurality of candidate video files. The processing unit parses each of the candidate video files by using a video semantic searching and collating process, such that a plurality of matched video files is selected and grouped to gather the grouped matched video files are in at least one video channel set.

The disclosure introduces a method of establishing semantic groups. At least one first-language episode term, at least one first-language date term, at least one first-language part number term or at least one first-language clip term in a first language is respectively compiled into an episode semantic group, a date semantic group, a part number semantic group or a clip number semantic group. Synonyms of the at least one second-language episode term, synonyms of the at least one second-language date term, synonyms of the at least one second-language part number term or synonyms of the at least one second-language clip term are respectively compiled into the episode semantic group, the date semantic group, the part number semantic group or the clip number semantic group. Synonym abbreviations of the at least one second-language episode teem, synonym abbreviations of the at least one second-language date term, synonym abbreviations of the at least one second language part: number term or synonym abbreviations of the at least one second-language clip term are respectively compiled into the episode semantic group, the date semantic group, the part number semantic group or the clip number semantic group.

The disclosure introduces a non-volatile computer storage medium of storing a computer program for storing a computer program, which is configured for an electronic apparatus to perform a method of searching and collating video files including the following steps. A semantic keyword is retrieved according to video information. The semantic keyword includes title information. A plurality of candidate video files is searched according to the semantic keyword in a video platform and obtained. Each of the candidate video files is parsed by using a video semantic searching and collating process, such that a plurality of matched video files is selected and grouped. The grouped matched video files are gathered in at least one video channel set.

The disclosure introduces a non-volatile computer storage medium for storing a computer program, which is configured for an electronic apparatus to perform a method of establishing semantic groups including the following steps. At least one first-language episode term, at least one first-language date term, at least one first-language part number term or at least one first-language clip term in a first language is respectively compiled into an episode semantic group, a date semantic group, a part number semantic group or a clip number semantic group. Synonyms of the at least one second-language episode term, synonyms of the at least one second-language date term, synonyms of the at least one second-language part number term or synonyms of the at least one second-language clip term are respectively compiled into the episode semantic group, the date semantic group, the part number semantic group or the clip number semantic group. Synonym abbreviations of the at least one second-language episode term, synonym abbreviations of the at least one second-language date term, synonym abbreviations of the at least one second language part number term or synonym abbreviations of the at least one second-language clip term are respectively compiled into the episode semantic group, the date semantic group, the part number semantic group or the clip number semantic group.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 6 is a schematic diagram illustrating regular expressions of semantic groups according to one of the exemplary embodiments of the disclosure.

DETAILED DESCRIPTION OF DISCLOSED EMBODIMENTS

Figure 1:
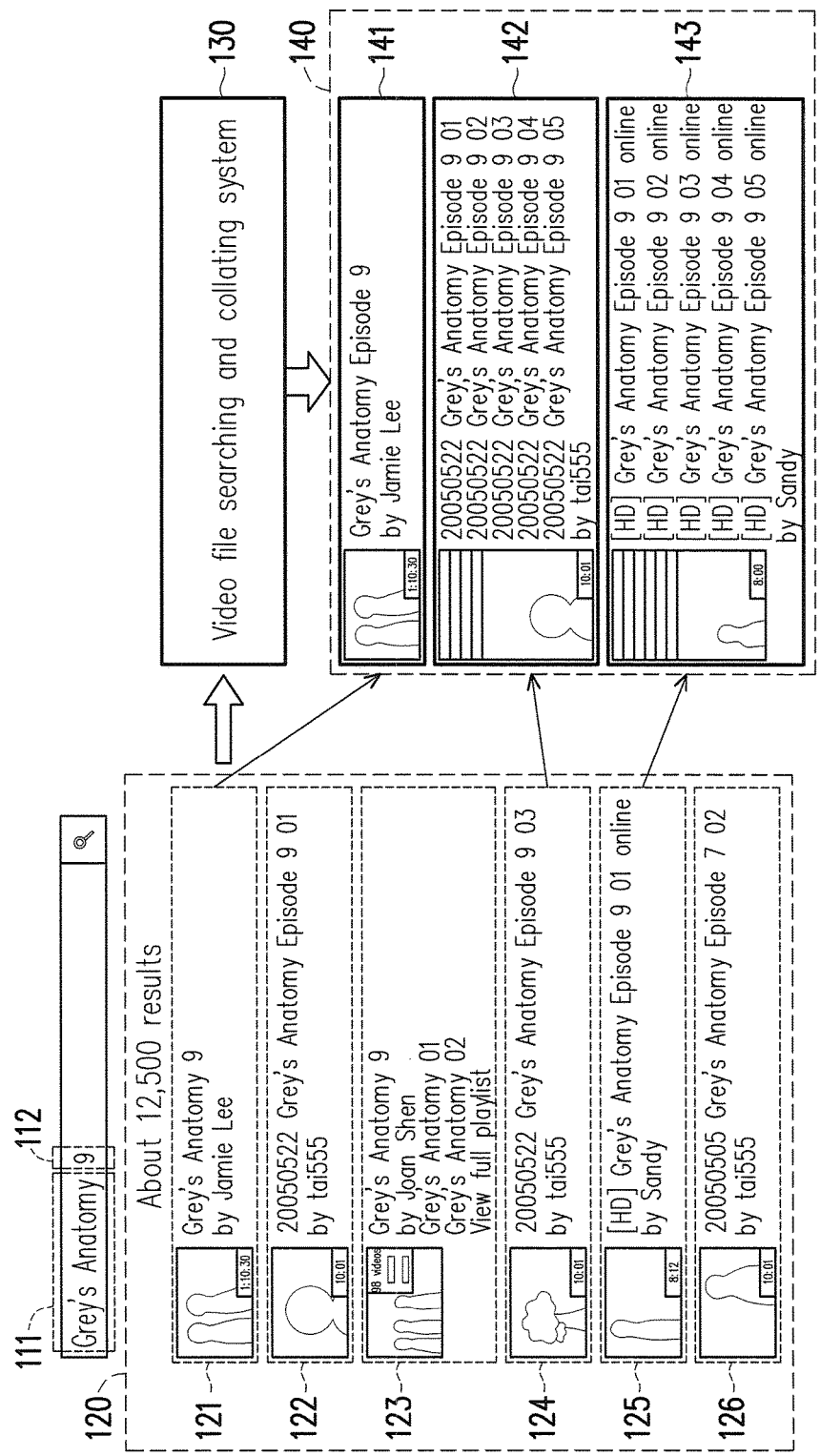
FIG. 1 is a schematic diagram of a method of searching and collating video files according to one of the exemplary embodiments of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" could be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

According to the exemplary embodiment of the disclosure, a method of searching and collating video files is introduced, by which candidate video files which meets initial conditions are automatically searched in a video platform on a network according to an electronic program guide (EPG) or video information obtained form another place, the candidate video files are grouped, such as by formatting titles of the video files so as to select matched video files from the candidate video files and arrange the matched video files according to episodes, and thereby, a user can view the video files conveniently.

According to one of the exemplary embodiments of the disclosure, a system of searching and collating video files is introduced. When the user uses a remote control apparatus to switch from a digital signal mode to a network signal mode, the video file searching and collating system automatically retrieves program information (e.g., a titles, an episode number, a category and so on) related to a digital signal program that the user is watching and collates the digital signal program according to the program information in at least one video channel set on a video platform, such that the user can obtain consecutive video files to watch one episode by one episode and satisfying viewing experience without manual searching.

The disclosure introduces a method of searching and collating video files. According to one of the exemplary embodiments of the disclosure, the method includes the following steps. Metadata of program information is retrieved. At least one semantic keyword is retrieved for searching in a video platform to obtain a plurality of candidate video files. The semantic keyword may be retrieved from a part of metadata of the video information or from any other source, such as source information related to the program information. The candidate video files (programs) from different sources (i.e., different uploaders or video platforms) are collected and collated in the same set according semantics by using a program semantic parsing module, program semantic search algorithm and program semantic collating algorithm. With the channel collection introduced by one of the exemplary embodiments of the disclosure, the semantics are changed to search the matched video files having consecutive episodes based on the program semantic search algorithm to establish at least one video channel set for the user to select. The program semantic parsing module is using a program semantic parsing method.

In the method of searching and collating video files introduced by the disclosure, the step of obtaining the metadata of the program information introduced in one of the exemplary embodiments further includes obtaining the metadata of the program information by using an electronic program guide (EPG) according to one exemplary embodiment. The EPG may be referred to, for example, inserting service information (SI) of standard definition or program information of other standards in transport stream (TS) complying with, for example, moving picture experts group-2 (MPEG-2) standard. Subscribers may know about information related to programs (video files), including program titles, programs categories, broadcast time, introductions, etc., through the EPG, for retrieving and managing the programs. In the method of the present embodiment, an EPG parser serves to retrieve the metadata describing the program information, such as program titles, categories, locations, video lengths, dates and so on.

In the method of searching and collating video files introduced by the disclosure, retrieving the at least one semantic keyword to search in the video platform and obtain the candidate video files includes retrieving the at least one semantic keyword by using a part of columns in the metadata of the program information, e.g., a program title and a category in the metadata. If the metadata of the program information already includes the program title and the category (e.g., the drama category, the variety category or the like), the part of the data column is directly parsed. If the data column cannot be parsed or is null, the data may be retrieved from any other source, such as source information related to the program information. For example, in an exemplary embodiment, the EPG may be parsed according to a currently viewed channel number and a current time so as to retrieve the program title and the category.

In the method of searching and collating video files introduced by the disclosure, the program semantic parsing module of one of the exemplary embodiments adopts, for example, a filter style and a semantic style for parsing. The filter style includes, for example, a universal filter semantic group and a user-defined filter semantic group. The universal filter semantic group serves to filter out improper video programs having titles including program type restriction semantics, for example, the programs having titles including sensational and violent terms. The user-defined filter semantic group serves to filter out programs having titles including undesired semantics, such as program having titles including ad terms, preview terms, background music. The semantic style includes, for example, an episode semantic group, a date semantic group, a clip semantic group, a definition semantic group. The episode semantic group serves to find out programs having titles including episode terms, such as "episode 11", "the $11^{th}$ episode", "Ep11" and so on. The date semantic group serves to find out programs having titles including date formats, such as "2012/07/10", "Jul. 10, 2012", "2012-7-10" and so on. The clip semantic group serves to find out programs having titles including clip terms, such as "Part1", "Pt1", "p1/6" and so on. The definition semantic group serves to search programs having titles including definition terms, such as "480p", "720p" and so on.

In the method of searching and collating video files introduced by the disclosure, the program semantic search algorithm according to one of the embodiment may serve to combine the program titles and the semantic information as at least one set of searching conditions to search in at least one video platform and feed back at least one searching result. The combination manner for the program semantic search algorithm may be, for example, directly combining the program titles with episodes or dates of the metadata as a set of searching conditions or combining the program titles with a plurality of synonyms in the metadata having semantics consistent with the episodes as a plurality of sets of searching conditions.

In the method of searching and collating video files introduced by the disclosure, in the program semantic collating algorithm introduced by one of the exemplary embodiments, different uploaders (or different platforms) have different naming habits, for example, "Grey's Anatomy" plus "the $11^{th}$ episode" may be schematically named as "Grey's Anatomy-11" or "Grey's Anatomy episode 11", or even clipped as "Grey's Anatomy episode 11 01", "Grey's Anatomy episode 11 02", and so on. Thus, according to the at least one searching result fed back by using the program semantic search algorithm, matched programs or video files are added in a program set (or video channel set, in other example) through the program semantic parsing module, such as comparing and filtering out unmatched programs by using the filter style. Then, according to metadata types of the programs, a proper semantic style is selected for the comparing operation, and the programs having the matched episode are added into the program set. Alternatively, following the matched clipped programs, other clipped programs owned by the same uploader continue to be searched, and thereby, all the clipped programs are integrated into a program group, and the program group is added into the program set.

In the method of searching and collating video files introduced by the disclosure, with the channel collection introduced by one of the exemplary embodiments of the disclosure, the semantics are changed to search the programs having consecutive episodes based on the program semantic search algorithm to establish the at least one channel. For example, the manner for the semantics being changed is determined according to the program category, such as episodes of the drama category being changed by accumulating from the first episode to the $N^{th}$ episode or dates of the variety category being changed by accumulating from the past N days to today. Then, the program title and the semantic group are combined as the at least one semantic keyword for performing the program semantic search algorithm until no more new programs are found so as to establish a semantic channel.

In the method of searching and collating video files introduced by the disclosure, the video file searching and collating system may search new programs by periodically changing the semantic group and performing the program semantic search algorithm so as to achieve automatically updating semantic programs in the channel. For example, the programs in the program set are grouped into a valid program sub set and an invalid program sub set according to validity of the programs, and the validity of the programs are periodically detected so as to dynamically update the sub sets. The validity of the programs may be obtained by means of an application interface (API) provided by the at least one video platform. The API may parse the validity for the video files (programs) of the at least one video channel set after a predetermined time period to divide the video files (programs) in the at least one video channel set into a valid program sub set and an invalid program sub set.

In the method of searching and collating video files introduced by the disclosure, it further includes the programs with higher definition or less clip number in the valid program sub set are recommended to the subscribers.

The method of searching and collating video files introduced by the disclosure will be described with reference to one of the exemplary embodiments along with the drawings as below, which does not construe any limitations to the disclosure.

The method of searching and collating video file according to the disclosure may be implemented in a software, a hardware or a firmware format or any combination thereof or stored in a non-transient computer-readable storage medium. In a scenario where the method is implemented in the hardware format, one of an application specific integrated circuits (ASIC), a digital signal processors (DSP), a digital signal processing device (DSPD), a programmable logic device (PLD), a field programmable gate arrays (FPGA), a processor, a controller, a microprocessor and any other electrical unit executing a specified task can be used to implement the method of searching and collating the video files according to the disclosure.

In a scenario where the method of searching and collating video files according to the embodiments of the disclosure is implemented in the software format, operations and functions of the method may be implemented by using software modules. A software module may be configured to execute at least one of the functions and the operations. A storage medium may be a non-transient computer-readable storage medium configured to store program commands as follows, a program command of executing at least one rule or routine in response to a program execution command and a program command of executing at least one operation corresponding to a user-defined condition in the executed rule or routine when the user-defined condition in the routine is reached. The storage medium may also be a non-transient computer-readable storage medium storing program commands as follows, a program command of configuring a rule including a condition and an operation corresponding to the condition in response to a speech input or a text input based on a natural language, a program command of enabling a rule in response to an command of instructing the rule, a program command of confirming whether the user-defined condition in the executed rule is reached and a program command of executing an operation corresponding to the user-defined condition.

FIG. 1 is a schematic diagram of a method of searching and collating video files according to one of the exemplary embodiments of the disclosure. In an exemplary embodiment, after partial contents of video information, such as title information 111 and episode information 112, are loaded into a search engine of at least one video platform, candidate video files 121 through 126 as shown in the searching result column are obtained. In the present exemplary embodiment, the search are performed according to information, such as the program title of "Grey's Anatomy" and the episode number of "9", but the disclosure is not limited thereto. The video platform may be a video searching platform, such as "YouTube" or "Dailymotion", but the disclosure is not limited thereto. According to the candidate video files, it can be learned that some of the searching results are not matched video files, for example, a candidate video file 126 is "Grey's Anatomy episode 7", while some are clips of the matched video files, for example, a candidate video file 124 is a clip of "Grey's Anatomy episode 9".

After a video file searching and collating system 130 parses the candidate video files, at least one or more matched video files are obtained, and the video file searching and collating system 130 collates the matched video files in a video collection 140. The video collection 140 includes video groups 141 through 143. Each video group is a complete video file including a plurality of episodes or at least one complete episode video content. For example, the video group 141 is a candidate video file 121 and does not have to be integrated with other video files since the candidate video file 121 is a complete video file having a complete episode video content. The video groups 142 and 143 are the matched video files having matched clip numbers and integrated with clipped video files belonging to other clips into a video file having a complete episode of content.

Figure 2:
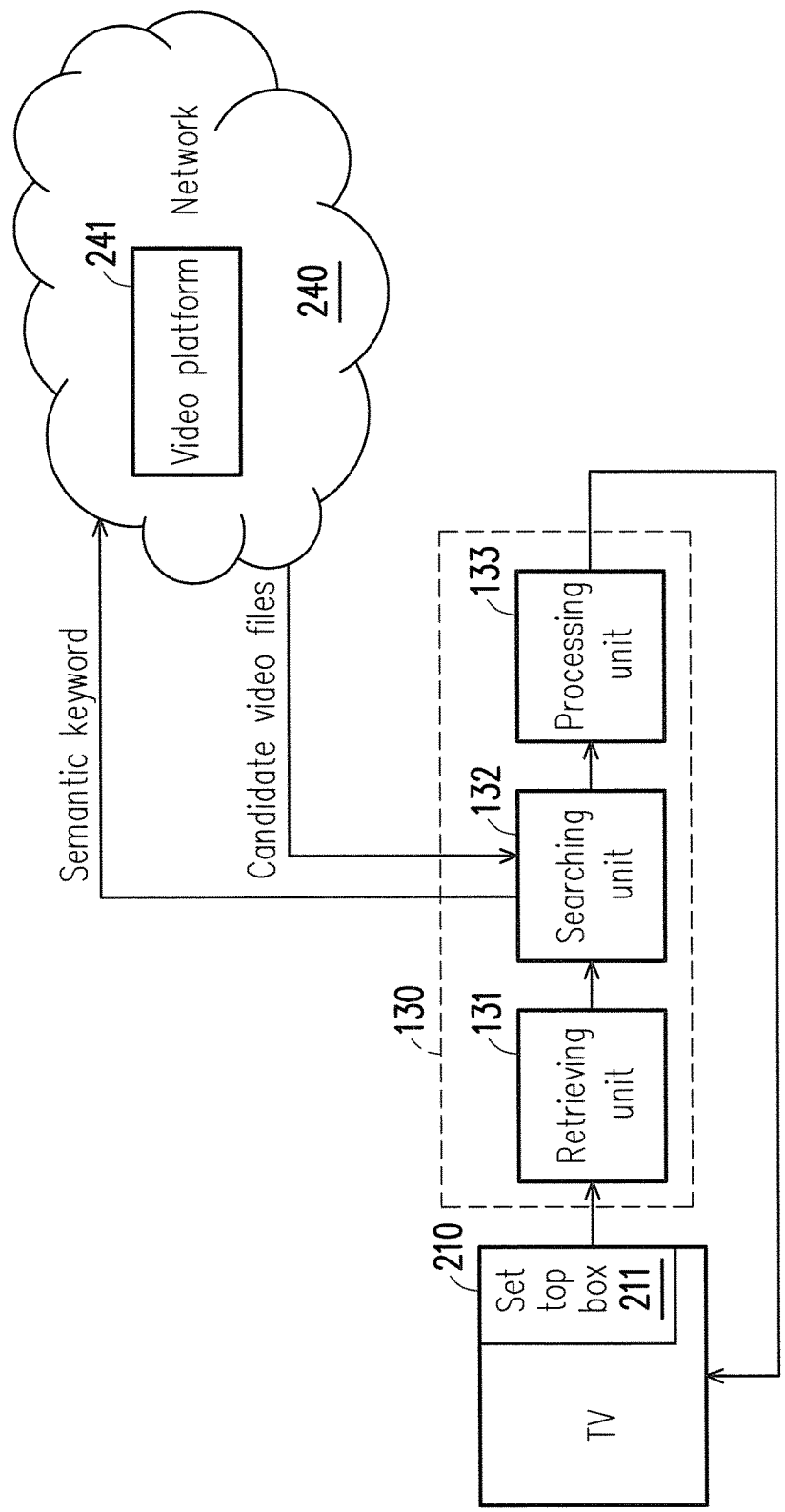
FIG. 2 is a schematic diagram of a system of searching and collating video files according to one of the exemplary embodiments of the disclosure.

FIG. 2 is a schematic diagram of a method of searching and collating video files according to one of the exemplary embodiments of the disclosure. Referring to both FIG. 1 and FIG. 2, a video file searching and collating system 130 including a retrieving unit 131, a searching unit 132 and a processing unit 133. The video file searching and collating system 130 may be implemented in a software format, a hardware format, a firmware format or any combination thereof or may be stored in a non-transient computer-readable storage medium. In an exemplary embodiment, the video file searching and collating system 130 may be built in a PC host, a television or a set top box, a LAN system server, a search engine host, a cloud computing system or the like. All video files for being searched may be stored in the LAN host, a database of the search engine host, a cloud database or the like. For descriptive convenience, the video file searching and collating system 130 is illustrated as an independent block herein, which construes no limitations to the disclosure, and may also be built in a connected TV or a television 210 and/or a set top box 211.

In an exemplary embodiment, retrieving unit 131 retrieves metadata of video information from, for example, the set top box 211 of the connected TV or the television 210. The video information may include, for example, title information, category information, playback time information, content introduction information, but the disclosure is not limited thereto. In an exemplary embodiment, the searching unit 132 serves, for example, title information and/or episode information as semantic keywords and searches for one or more candidate video files matching the semantic keywords in a video platform 241 over a network 240. The video platform 241 may be a video searching platform, such as "YouTube" or "Dailymotion", but the disclosure is not limited thereto. In an exemplary embodiment, if the metadata of the video information includes a program title and a category (e.g., the drama category, the variety category or the like), the data thereof is directly parsed. If the data column cannot be parsed or is null, the data may be retrieved from any other source, such as source information related to the program information. For example, in an exemplary embodiment, an electronic program guide (EPG) website may be parsed according to a currently viewed channel number and a current time via the network 240 to retrieve the program title and the category.

In an exemplary embodiment, the processing unit 133 parses a title of each of the candidate video files to generate a formatted title of each of the candidate video files, selects matched video files according to the formatted titles from the candidate video files and groups the matched video files to form video groups and video collection. Semantic information of the formatted titles of the matched video files corresponding to the video information accorded in the searching operation.

In one of the exemplary embodiments, the video information may be obtained by retrieving an EPG from the set top box 211 of the connected TV or the television 210. In an exemplary embodiment, the EPG may be service information (SI) inserted in a transport stream (TS) complying with MPEG-2 standard. The user may learn information related to programs (including program titles, program categories, playback times, content introductions and so on) through the EPG so as to carry out program searching and management.

Figure 3:
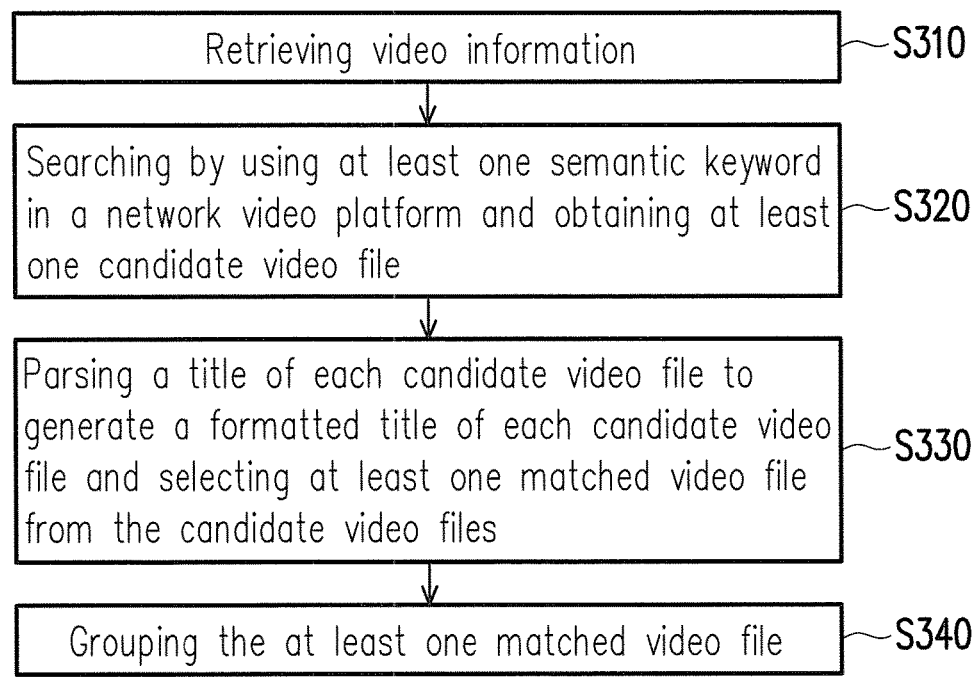
FIG. 3 is a schematic flowchart of a method of searching and collating video files according to an exemplary embodiment of the disclosure.

Next, a method of searching and collating video files according to one of the exemplary embodiments of the disclosure will be described. With reference to FIG. 3, FIG. 3 is a schematic flowchart of a method of searching and collating video files according to an exemplary embodiment of the disclosure. The method of the present exemplary embodiment is applicable to search and collate video files, and may be performed along with the video file searching and collating system illustrated in FIG. 2, of which detail steps will be described below, but the disclosure is not limited thereto.

Referring to FIG. 3, in step S310, video information is retrieved. The video information includes, for example, title information. In the present exemplary embodiment, when the user switches from a digital signal mode to a network signal mode, the video file searching and collating system retrieves video information (e.g., a video title, episode information, category information, playback time information and content introduction information provided through an EPG) related to the digital signal program that the user is watching. If metadata of the program already includes the video tile and the video category (e.g., the drama category, variety category and so on), the data thereof is directly retrieved. If the title information, the category information or the episode information is incapable of being retrieved, the title information, the category information and the episode information are retrieved according to a channel number and a current time of the currently viewed digital signal program through network connection by using an EPG website, such as "now TV" (website: http://nowtv.now-.com/). In other exemplary embodiments, the video file searching and collating system may also retrieve the video information related to the currently viewed program while the user is watching the digital signal program.

In step S320, the video file searching and collating system searches according to at least one semantic keyword in the network video platform and obtains at least one candidate video file. The at least one semantic keyword includes title information, for example. In the present exemplary embodiment, at least one candidate video file initially filtered by the search engine of the video platform may be obtained from the network video platform. However, initial filtering results of the search engine may be insufficient for needs, and further processes have to be performed by the video file searching and collating system.

In step S330, the title of each candidate video file is parsed to generate a formatted title of each candidate video file. According to the formatted title, at least one matched video file is selected from the candidate video files. In step S340, the matched video files are grouped by using, for example, a grouping manner, and semantic information of the formatted title of the least one matched video file is corresponding to the video information accorded by the searching operation. In the present exemplary embodiment, the processing unit of the video file searching and collating system parses the title of the at least one initially selected candidate video file. For example, in an exemplary embodiment, information such as title information and definition information included in the title is outputted in the regular expression introduced by the disclosure. The parsing operation and definition of grouping that are mentioned in the present embodiment will be described below. In the present exemplary embodiment, the step of the user switching from the digital signal mode to the network signal mode by using a remote control apparatus serves to trigger the operation of step S310 of the method of searching and collating the video files. In an exemplary embodiment, the aforementioned selection means may be built in the remote control apparatus for controlling signal switching of a digital television (e.g., a playback unit of the digital television) or built in a touch display, a user interface or any interface for the user to input or select on the display. Those that serve the user's conveniently or easily switching of the digital television signal as the triggering conditions pertain to the scope of applications of the disclosure.

Figure 4A:
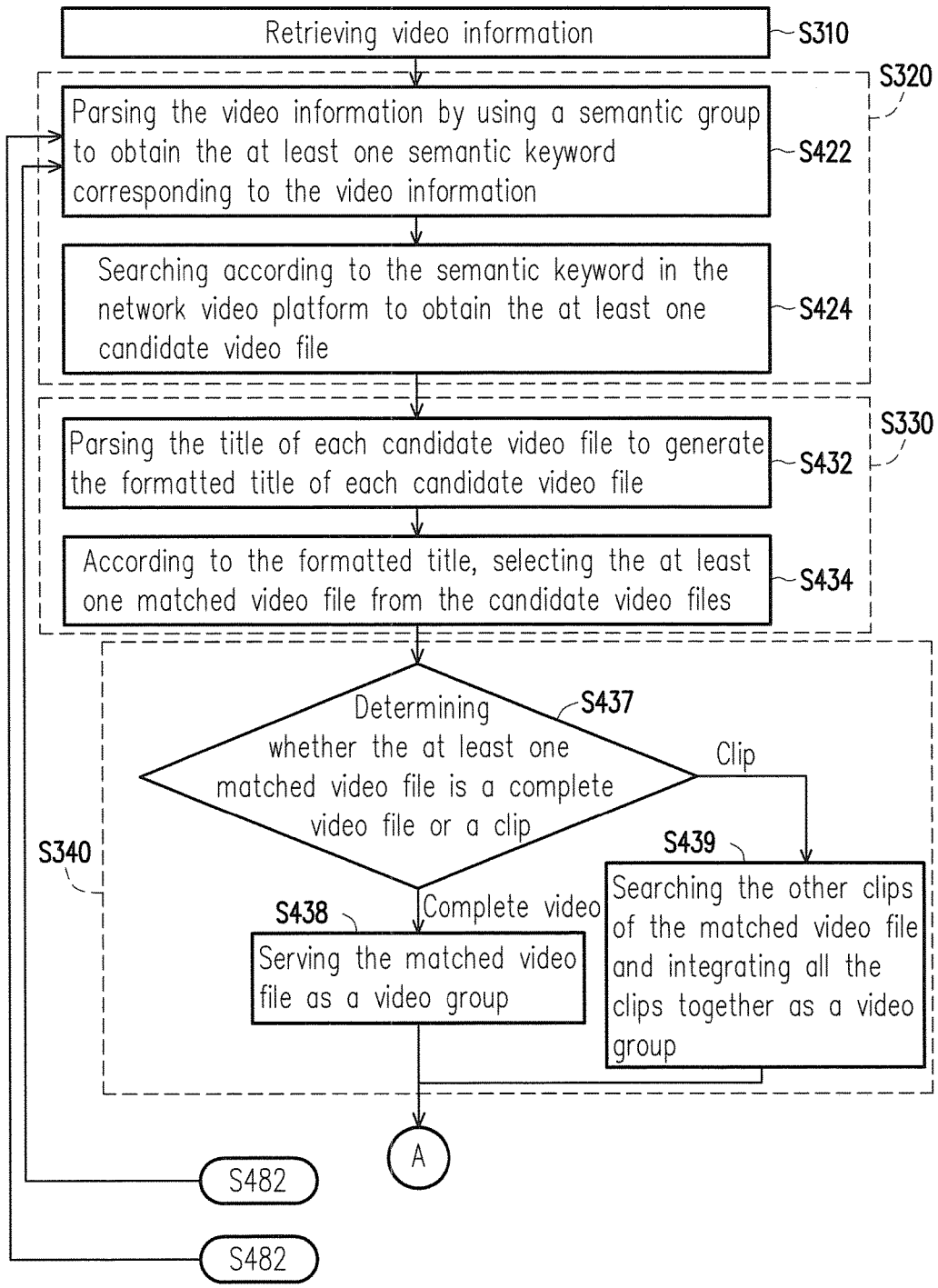
FIGS. 4A and 4B are combined as a schematic flowchart of a method of searching and collating video files according to one of the exemplary embodiments of the disclosure.
Figure 4B:
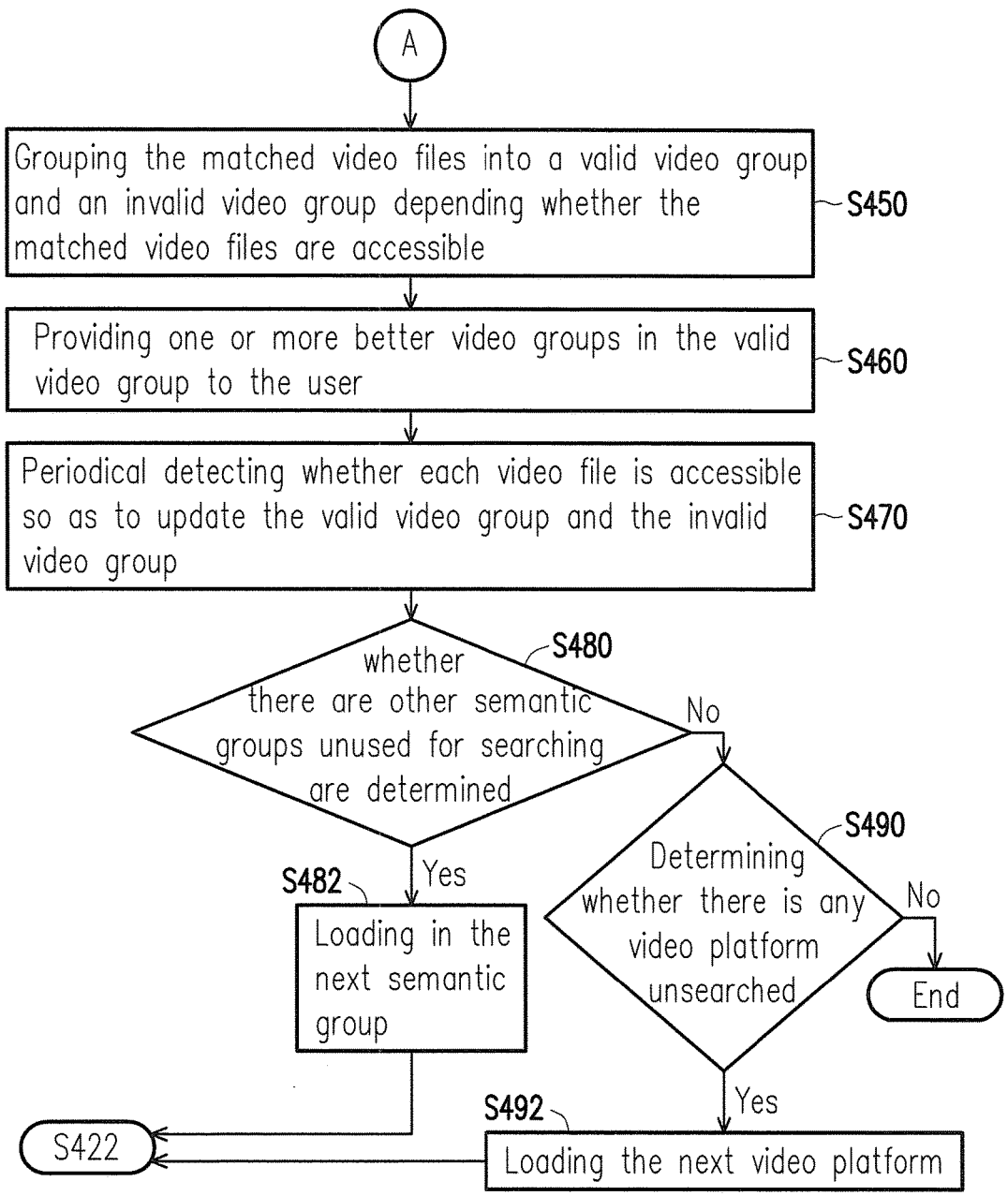

FIG. 4 is a schematic flowchart of a method of searching and collating video files according to one of the exemplary embodiments of the disclosure. It is to be noted here that FIG. 4 is further divided into FIG. 4A and FIG. 4B in two separate pages with a node A as the connection of the two drawings. With reference to FIG. 4A and FIG. 4B, the present exemplary embodiment is different from the embodiment illustrated in FIG. 3 in that the present exemplary illustrated in FIG. 4A and FIG. 4B further includes steps of parsing the video information by using a semantic group to obtain the at least one semantic keyword corresponding to the video information (step S422) and searching according to the semantic keyword in the network video platform to obtain the at least one candidate video file (step S424). Step S330 of the embodiment illustrated in FIG. 3 may further include steps S432 through S439 of the embodiment illustrated in FIG. 4.

In step S432, the title of each candidate video file is parsed to generate the formatted title of each candidate video file. In step S434, according to the formatted title, the at least one matched video file is selected from the candidate video files. In the present exemplary embodiment, the processing unit of the video file searching and collating system compares video information with the formatted title information of each candidate video file. If video information that is identical to the formatted title information of each candidate video file, it indicates that the candidate video file is a matched video file. Step S340 follows step S434, i.e., the matched video files are grouped. Step S340 may further include the following steps. In step S437, whether the at least one matched video file is a complete video file or a clip is determined. In step S438, if the at least one matched video file is a complete video, the at least one matched video file serves as a video group. In step S439, if the at least one matched video file is a clip, the other clips of the matched video file are searched, and all the clips are integrated together as a video group. In the present exemplary embodiment, the other clips may be searched according to an account uploading the matched video file or in other matched video files, but the disclosure is not limited thereto. The video semantic searching and collating process may be step S330 and step S340 illustrated in FIG. 4, but the disclosure is not limited thereto. The program semantic search algorithm may be step S330 illustrated in FIG. 4. The program semantic collating algorithm may be step S340 illustrated in FIG. 4. The program semantic parsing method may be step S432 illustrated in FIG. 4, but the disclosure is not limited thereto.

In step S450, each of the matched video files is grouped into a valid video group and an invalid video group depending whether the matched video files are accessible. In the present exemplary embodiment, the video file searching and collating system only provides the valid video group to the user. After the matched video files is grouped into the valid video group and the invalid video group according to whether the matched video file is accessible, in step S470, whether each video file is accessible is periodically detected so as to update the valid video group and the invalid video group. After step S450, as in step S460, one or more better video groups in the valid video group is provided to the user, the better video groups may have higher definition than the other video groups, in video platforms having higher transmission speed than the other video groups, or the like, but the disclosure is not limited thereto. On other exemplary embodiments, step S460 may be performed after step S470.

In step S480, whether there are other semantic groups unused for searching are determined. If there are other semantic groups unused for searching, in step S482, the next semantic group is loaded in, and step S422 is returned to. If there are no other semantic groups unused for searching, step S490 is entered to determine whether there is any video platform unsearched. If there is any video platform unsearched, step S492 is entered to load the next video platform and step S422 is returned to. If there is no video platform unsearched, the method of searching and collating video files is ended.

Figure 5:
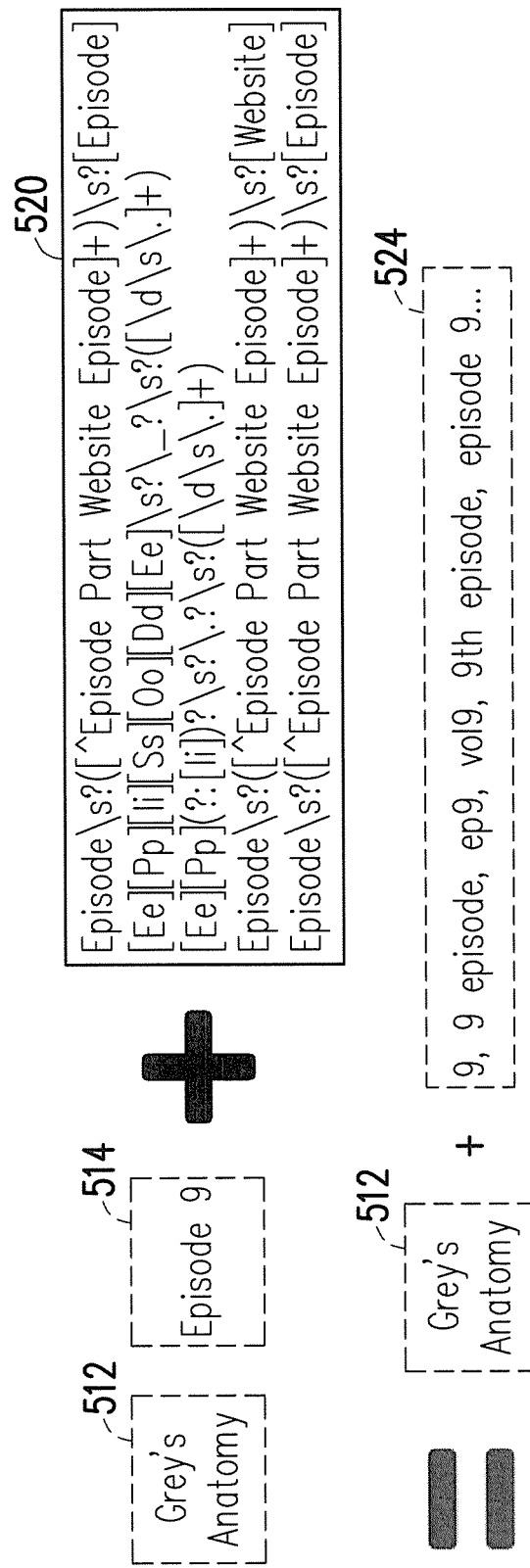
FIG. 5 is a schematic of adding searching conditions according to one of the exemplary embodiments of the disclosure.

FIG. 5 is a schematic of adding searching conditions according to one of the exemplary embodiments of the disclosure. In the present embodiment, title information 512 and episode information 514 about to enter the search engine may be processed by the episode semantic group 520 so as to generate synonyms related to the episode information 514. For example, in FIG. 5, "Episode 9" indicated in the episode information 514 may be processed by the episode semantic group 520 to generate a plurality of synonyms 524 related to the episode information, such as "9", "9 episode", "ep9", "vol9", "9$^{th}$ episode" and so on, and the synonyms 524 may be combined with the title information 512 to form a plurality of semantic keywords. In the present exemplary embodiment, in step S422 where "the video information is parsed by using the semantic group to obtain the at least one semantic keyword corresponding to the video information", the semantic group as referred to may not only include the episode semantic group but also a date semantic group, a clip number semantic group, a definition semantic group, for example, but the disclosure is not limited thereto. In the present exemplary embodiment, when the user is watching the digital television or switching from the digital signal mode to the network signal mode, he/she may previously set (e.g., by entering a setting column of the digital television) whether to parse the video information by using the semantic group in increase the semantic keywords for searching, but the disclosure is not limited thereto.

FIG. 6 is a schematic diagram illustrating regular expressions of semantic groups according to one of the exemplary embodiments of the disclosure. The semantic group may include, for example, a universal filter semantic group 610, user-defined filter semantic group 620, an episode semantic group 630, a date semantic group 640, a clip number semantic group 650 and a definition semantic group 660, but the disclosure is not limited thereto. The universal filter semantic group 610 may serve to filter out indecent keywords, such as porn, candid, and so on, but the disclosure is not limited thereto. The user-defined filter semantic group 620 varies the keywords with the category information of the video files. For example, for the video files having the category information of the variety category, the drama category, the movie category, the user-defined filter semantic group 620 may include, for example, "soundtrack", "preview", "behind the scenes", "mp3", "mp4" and so on, but the disclosure is not limited thereto. For instance, if the video files having the category information of the music category, the user-defined filter semantic group 620 may not include keywords, such as "mp3", "mp4", "opening theme" and so on that commonly appear in the titles of music videos. The episode semantic group 630 includes episode keywords and episode keyword formats that commonly appear in network videos, as illustrated in the episode semantic group 630 of FIG. 6. The date semantic group 640 includes date keywords and date keyword formats that commonly appear in the network videos, as illustrated in the episode semantic group 640 of FIG. 6. The clip number semantic group 650 includes clip number keywords and clip number keywords formats that are commonly used in network video files, such as those illustrated in the clip number semantic group 650. The definition semantic group 660 includes definition keywords and the definition keywords formats that are commonly used in network video files, such as "360P", "720P", "1080P" and so on which are keywords related to the definition commonly used in video titles. All of the aforementioned semantic groups may facilitate in adding semantics and semantic formats by actively searching titles of network video files or any other manner, but the disclosure is not limited thereto. A method for establishing the semantic groups will be described in detail below.

Figure 7A:
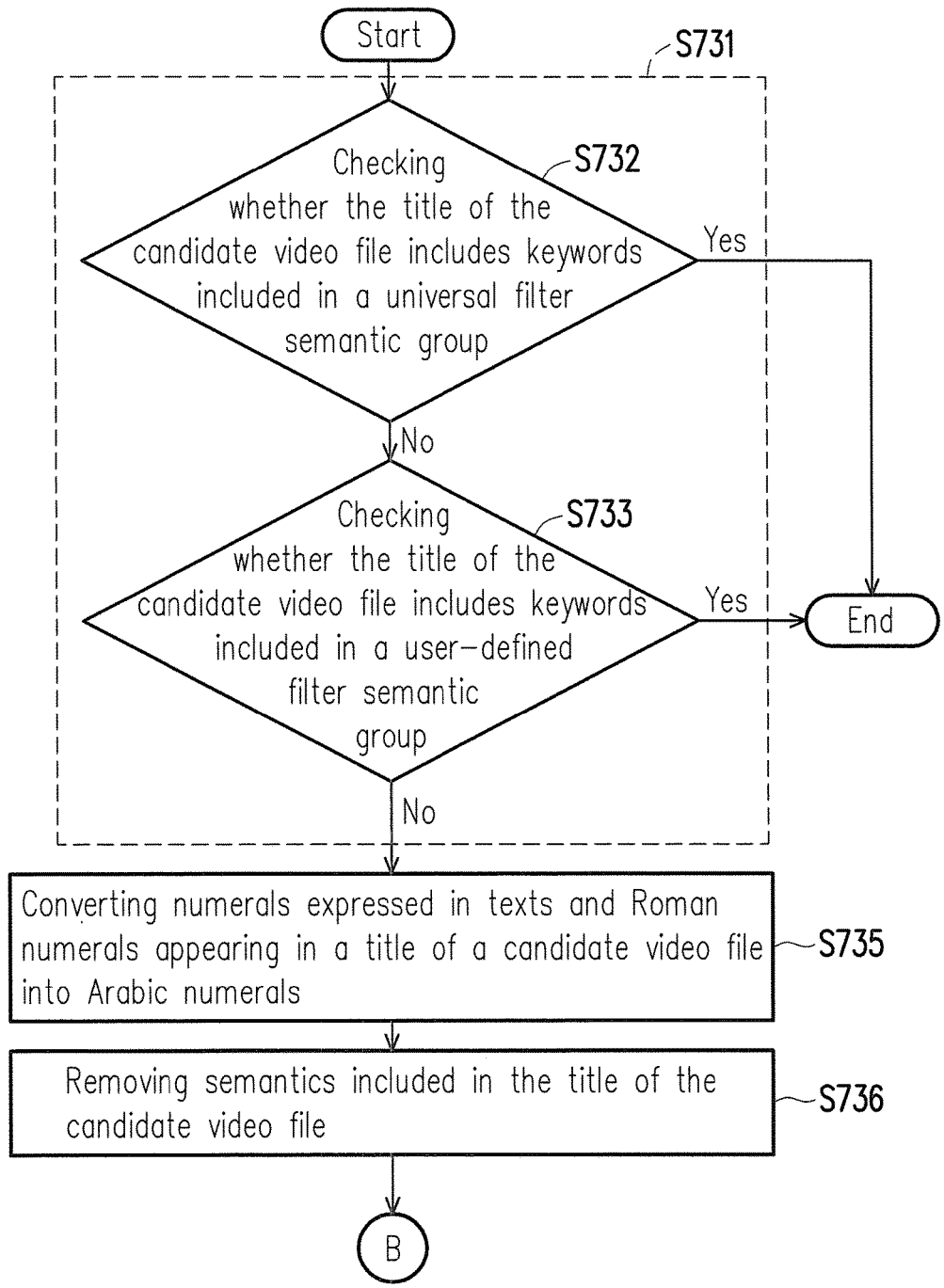
FIGS. 7A and 7B are combined as a schematic flowchart of parsing titles of candidate video files according to one of the exemplary embodiments of the disclosure.
Figure 7B:
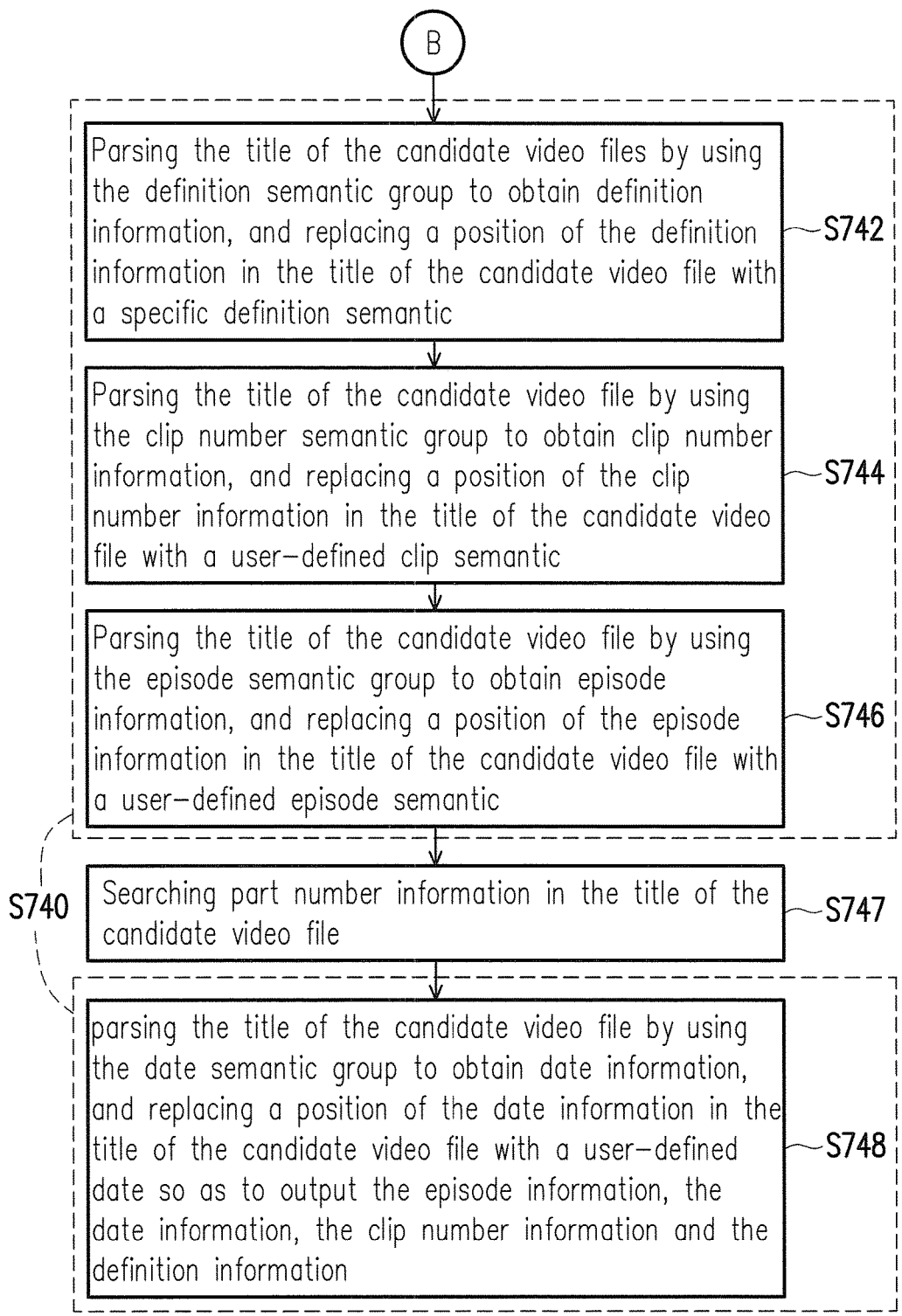

FIG. 7 is a schematic flowchart of parsing titles of candidate video files according to one of the exemplary embodiments of the disclosure. FIG. 7 may also be the schematic flowchart of step S432 illustrated in FIG. 4 which parses the title of each candidate video file to generate a formatted title of each candidate video file like, but the disclosure is not limited thereto. It is to be noted here that FIG. 7 is further divided into FIG. 7A and FIG. 7B in two separate pages with a node B as the connection of the two drawings.

With reference to FIG. 7A and FIG. 7B, in step S731, a filter semantic group serves to filter the titles of the candidate video files. Step S731 may include step S732 and step S733. In step S732, a universal filter semantic group serves to filter the titles of the candidate video files, if a semantic included in the universal filter semantic group appear in a title, the candidate video file having the title is not one of the matched video files. In step S733, a user-defined filter semantic group serves to filter the titles of the candidate video files. If a semantic included in the user-defined filter semantic group appear in a title, the candidate video file having the title is not one of the matched video files. In the present exemplary embodiment, the orders of step S732 and step S733 may be exchanged, or alternatively, one or all of the two steps may be omitted. The universal filter semantic group may be the universal filter semantic group 610 illustrated in FIG. 6, and the user-defined filter semantic group may be the user-defined filter semantic group 620 illustrated in FIG. 6 or may also be selected correspondingly according to the category information of the candidate video files. For example, a sports category user-defined filter semantic group is only used to filter the candidate video files belonging to the sports category, and a news category user-defined filter semantic group is only used to filter the candidate video files belonging to the news category, but the disclosure is not limited thereto. If in step S732 and step S733, is a candidate video file having a keyword included in the filter semantic group appear in the title, the parsing operation of the candidate video file is ended, step S734 is entered, and the candidate video file is not selected as a matched video file.

An example of a candidate video file having a title, "20130711 Grey's Anatomy Episode Twelve Part5 Give me 1 million[720p]," will be provided to describe the method illustrated in FIG. 7 below. First, in step S732, whether a keyword included in the universal filter semantic group appear in the title of the candidate video file, such as "AV", "video chat". Since the title of the candidate video file does not have any keyword included in the universal filter semantic group, step S733 is entered to determine whether a keyword included in the drama category user-defined filter semantic group appear in the title, such as "preview", "ending", "clip" and so on. Since the title of the candidate video file does not have any keyword included in the user-defined filter semantic group, step S735 is entered.

In step S735, numerals expressed in texts and Roman numerals appearing in a title of a candidate video file are converted into Arabic numerals. For example, "three thousand" is converted in to "3000", and "IV" is converted into "4". Thus, "1 million" appearing in the title of the candidate video file is converted into "1000000" in step S735, and the title is formed in a format as follows:

"20130711 {video title position} Episode{text-expressed numeral 12} Part5 Give me 1 {text-expressed numeral 1000000} [720p]"

In step S736, semantics included in the title of the candidate video file which incurs mis-determination easily are removed, such as "1 million" in the title of the candidate video file of the present exemplary embodiment or "Floor 11" in a title of a candidate video file of another exemplary embodiment, which easily incur mis-determination to the video file searching and collating system and cause the aforementioned semantics to be mis-determined as semantics related to episode information, date information, definition information or any other information. In the present exemplary embodiment, after the title of the candidate video file is converted in step S736, the semantic, "1 million", which incurs mis-determination easily are removed, and the title is formed in a format as follows:

"20130711 {video title position} Episode{text-expressed 12} Part5 Give me [720p]"

In step S740, at least one of the definition semantic group, the clip number semantic group, the episode semantic group and the date semantic group serves to parse the title of the candidate video file so as to output at least one of the definition information, the clip number information, the episode information or the date information. In the present exemplary embodiment, in step S742 through step S748, the definition semantic group, the clip number semantic group, the episode semantic group and the date semantic group are sequentially used to parse the title of the candidate video file, but the sequence is not limited in the disclosure. In the present exemplary embodiment, the title of the candidate video file may also be parsed by using part of the semantic groups.

In step S742, the definition semantic group serves to parse the title of the candidate video files to obtain definition information, and a position of the definition information in the title of the candidate video file is replace by a specific definition semantic. After the title is parsed in step S742, the definition information "720P" in the title is obtained, and the title is formed in a format as follows:

"20130711 {video title position} Episode{text-expressed12} Part5 Give me [{definition position}]"

In step S744, the clip number semantic group serves to parse the title of the candidate video file to obtain clip number information, and a position of the clip number information in the title of the candidate video file is replaced by a user-defined clip semantic. After the title is parsed in step S744, the clip number information "5" in the title is obtained, and the title is formed in a format as follows:

"20130711 {video title position} Episode {text-expressed12} {clip number position} Give me [{definition position}]"

In step S746, the episode semantic group serves to parse the title of the candidate video file to obtain episode information, and a position of the episode information in the title of the candidate video file is replaced by a user-defined episode semantic. After the title is parsed in step S74, the episode information "12" in the title is obtained, and the title is formed in a format as follows:

"20130711 {video title position} Episode {text-expressed {episode position} } {clip number position} Give me [{definition position}]"

In the present exemplary embodiment, after step S746 where the episode semantic group serves to parse the title of the candidate video file, in step S747, part number information in the title of the candidate video file is searched and after the title is parsed by using the part number information in step S747, part number information "1" in the title is obtained, and the title is formed in a format as follows:

"20130711 {video title position} Episode{text-expressed{episode position}} {clip number position} Give me [{definition position}]"

In step S748, the date semantic group serves to parse the title of the candidate video file to obtain date information, and a position of the date information in the title of the candidate video file is replaced by a user-defined date so as to output the episode information, the date information, the clip number information and the definition information. After the title is parsed in step S748, date information "2013/7/11" in the title is obtained, and the title is formed in a format as follows:

"{date position} {video title position} Episode{text-expressed{episode position}} {clip number position} Give me [{definition position}]"

Additionally, the step "so as to output the episode information, the date information, the clip number information and the definition information" as referred in step S748 may be performed after all of the information is obtained or in the meantime when the episode information, the date information, the clip number information and the definition information are obtained in the present exemplary embodiment, but the disclosure is not limited thereto. The "formatted title" as referred to herein means "the information obtained by parsing the title of the candidate video file", but does not have to use a specific semantic to replace the position of the information in the title of the candidate video file.

Figure 8:
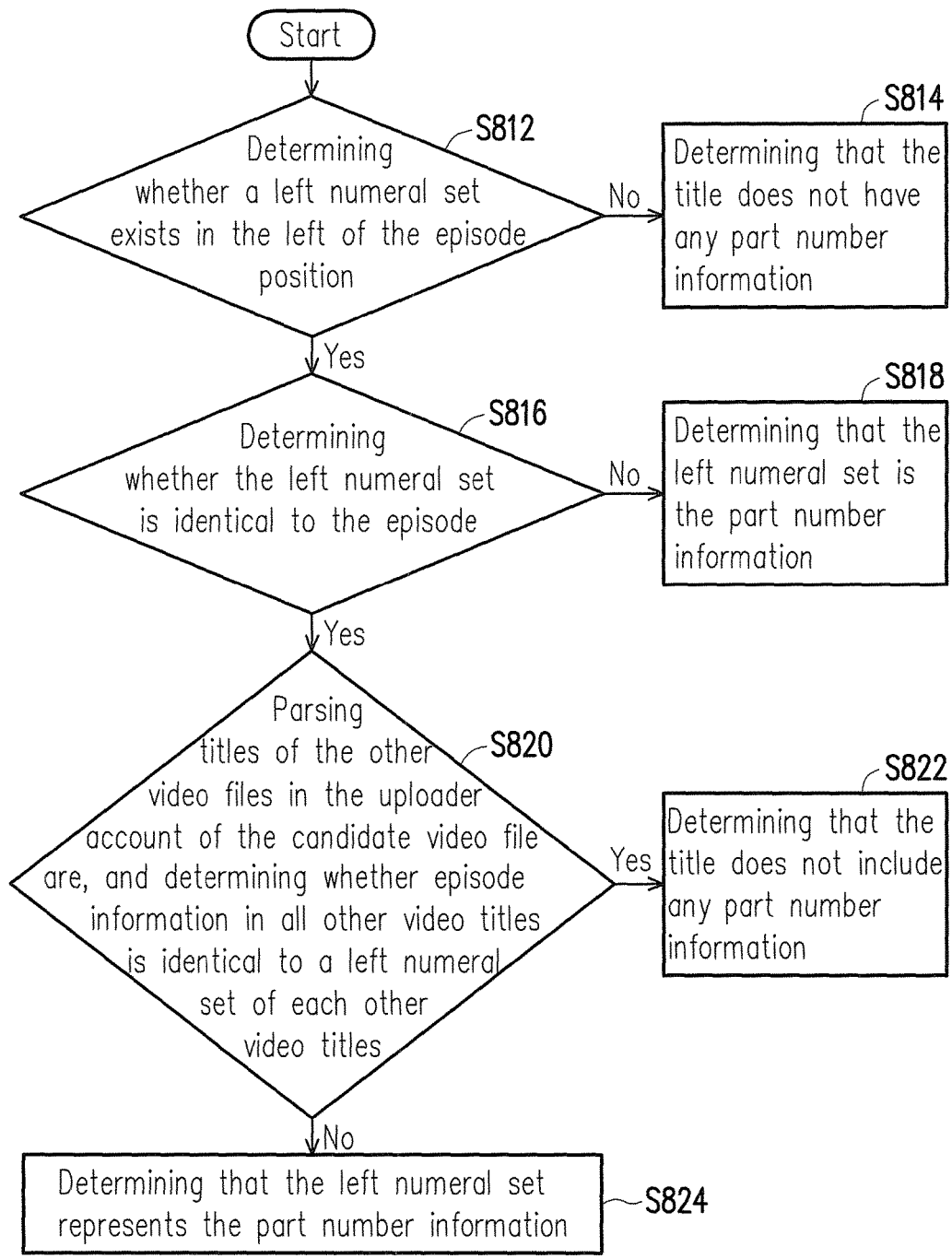
FIG. 8 is a schematic flowchart of identifying a part number by using episode according to one of the exemplary embodiments of the disclosure.

FIG. 8 is a schematic flowchart of identifying a part number by using episode according to one of the exemplary embodiments of the disclosure. If any episode information is obtained in step S746 illustrated in FIG. 7, the part number information may be searched by the method of the schematic flowchart illustrated in FIG. 8. After the episode information is found, in step S812, whether a left numeral set exists in the left of the episode position is determined. If no numeral exists in the left of the episode position, in step S814, the title does not have any part number information, the part number information may outputted as "1" as illustrated in step S747, or a value predetermined by the video file searching and collating system may be outputted, but the disclosure is not limited thereto. If numeral exist in the left of the episode position, in step S816, whether the left numeral set is identical to the episode is compared. If the left numeral set is not identical to the episode, in step S818, the left numeral set is the part number information. If the left numeral set is identical to the episode, the format of the video title has to be further confirmed since the left numeral set may also represent the episode among commonly used formats of video titles when the left numeral set is identical to the episode. The video title uploaded by the same uploader may use same format, and thus, in step S820, titles of the other video files in the uploader account of the candidate video file are parsed, and whether episode information in all other video titles is identical to a left numeral set of each other video titles is determined. If the episode information in all other video titles is identical to the left numeral set of each other video titles, it represents that in the formats of the video titles of the uploader account, the left numeral set is the episode information, and thus, in step S822, the title does not include any part number information. If there is at least one left numeral set of other video titles is not identical to the episode information, it represents that in the formats of the video titles of the uploader account, the left numeral set is the part number information, and thus, in step S824, the left numeral set represents the part number information.

Figure 9:
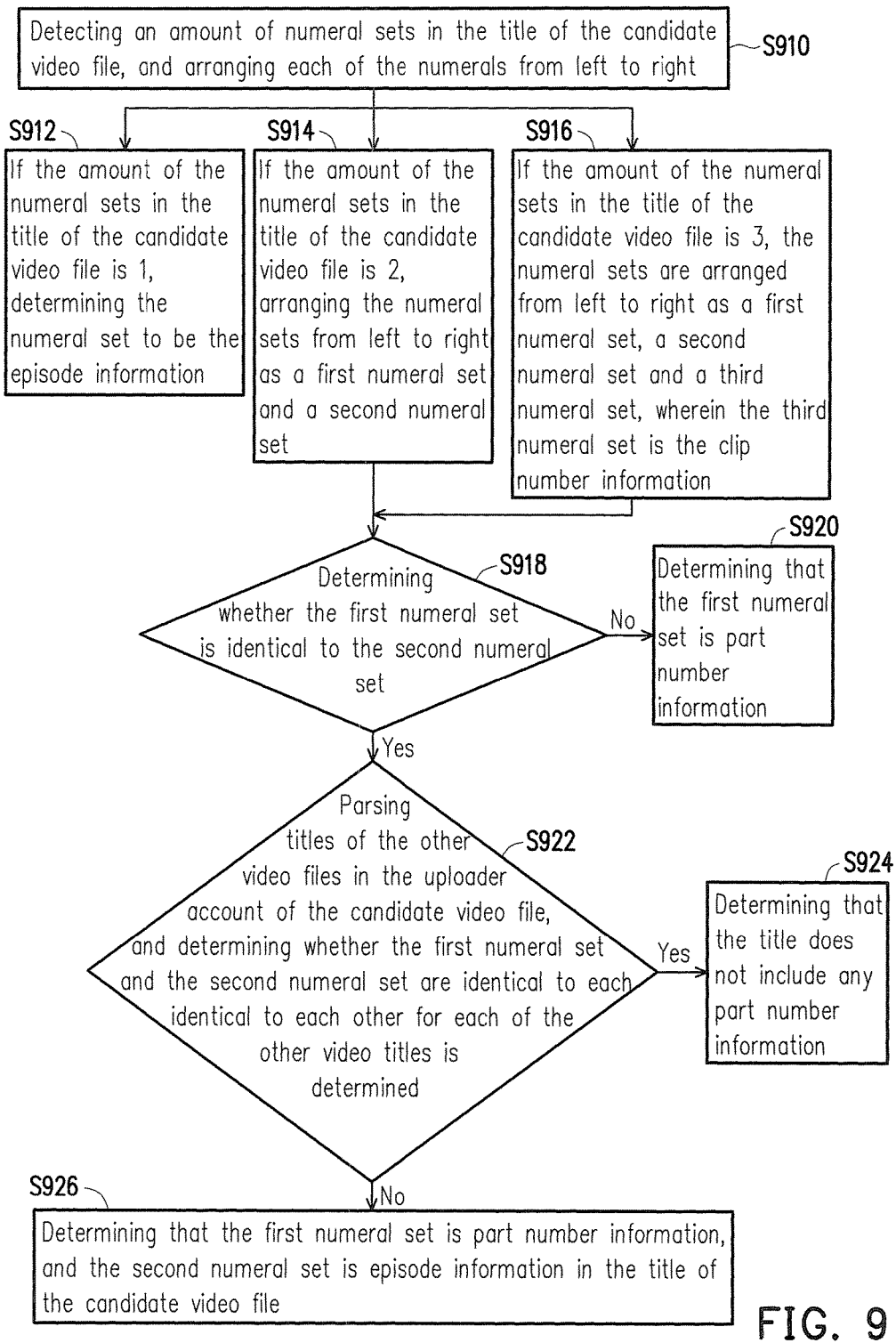
FIG. 9 is a schematic flowchart of identifying a part number by using a digit group according to one of the exemplary embodiments of the disclosure.

With reference to FIG. 9, FIG. 9 is a schematic flowchart of identifying a part number by using a digit group according to one of the exemplary embodiments of the disclosure. If no episode information is found in step S746 illustrated in FIG. 7, the part number information may be searched by using the method illustrated in FIG. 9. In step S910, an amount of numeral sets in the title of the candidate video file is detected, and each of the numerals is arranged from left to right. In step S912, if the amount of the numeral sets in the title of the candidate video file is 1, the numeral set is determined to be the episode information. In step S914, if the amount of the numeral sets in the title of the candidate video file is 2, the numeral sets are arranged from left to right as a first numeral set and a second numeral set. In step S916, if the amount of the numeral sets in the title of the candidate video file is 3, the numeral sets are arranged from left to right as a first numeral set, a second numeral set and a third numeral set, wherein the third numeral set is the clip number information.

Thereafter, no matter whether the amount of the numeral sets in the title of the candidate video file is 2 or 3, in step S918, whether the first numeral set is identical to the second numeral set has to be determined. In step S920, if the first numeral set is not identical to the second numeral set, the first numeral set is part number information. If the first numeral set is identical to the second numeral set, the format of the video title has to be further confirmed since when the first numeral set is identical to the second numeral set, the both the first numeral set and the second numeral set may be episode numbers among commonly used formats in video titles. The video title uploaded by the same uploader may use same format, and thus, in step S922, titles of the other video files in the uploader account of the candidate video file are parsed, and whether the first numeral set and the second numeral set are identical to each other for each of the other video titles is determined. If the first numeral set in each of the other video titles is identical to the second numeral set in each of the other video titles, it represents that in the formats of the video titles of the uploader account, both the first numeral set and the second numeral set may be the episode information. Thus, in step S924, the title does not include any part number information, and the part number information may be outputted as "1" in step S747, for example, or a value predetermined by the video file searching and collating system may be outputted, but the disclosure is not limited thereto. If the first numeral set and the second numeral set of each of the other video titles are not identical, it represents that in the formats of the video titles of the uploader account, the first numeral set represents the part number information, and the second numeral set represents episode information. Accordingly, in step S926, in the title of the candidate video file, the first numeral set is part number information, and the second numeral set is episode information.

Referring to FIG. 4, when step S439 is performed, an issue of overlapping part numbers may occur. The overlapping part numbers refer to that when searching for other clip video files, clip video files uploaded by different uploaders would have different clip lengths and clip paragraphs due to different habits of the different uploaders splitting the video files, even though the clip video files are form video files having the same title information and episode information. Thus, if the clip videos are integrated merely by using the continuous clip number information directly, an issue of incoherent video paragraphs is probably incurred. Therefore, in step S439, at least one of the other clip videos belonging to the uploader account of the candidate video files is searched. If the other clip videos conforms the condition of having the same title information as the matched video file and further having the same episode information or the date information as the matched video file are integrated together to form the video group. In the present exemplary embodiment, an application programming interface (API) of a video platform may be used to search other clip videos having the same episode number and owned by the same uploader account. For example, in the YouTube video platform, the YouTube API may be used to search other clip videos having the same episode number and owned by the same uploader account, but the disclosure is not limited thereto.

Figure 10A:
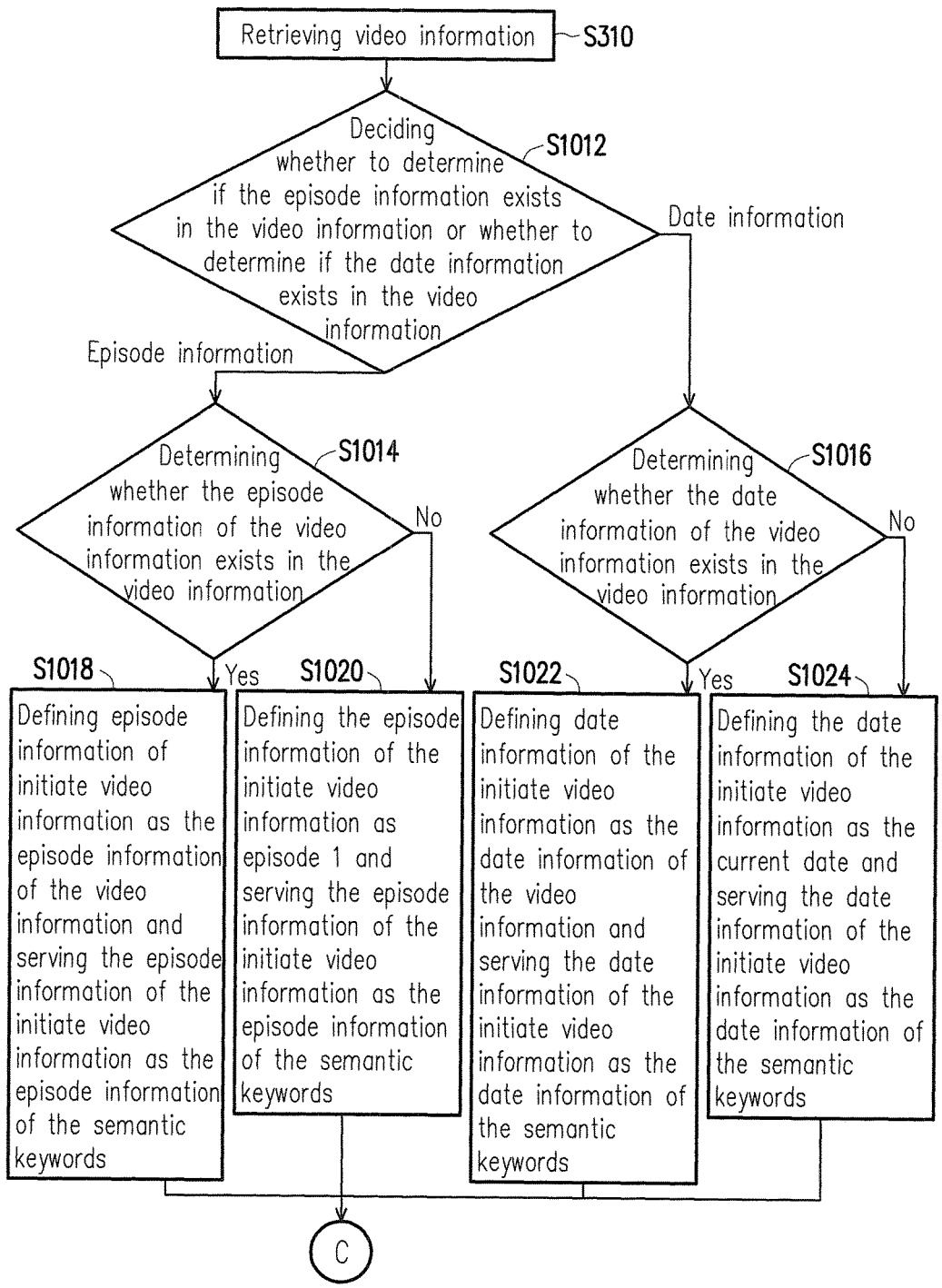
FIGS. 10A and 10B are combined as a schematic flowchart of collating individual video files in a channel according to categories according to one of the exemplary embodiments of the disclosure.
Figure 10B:
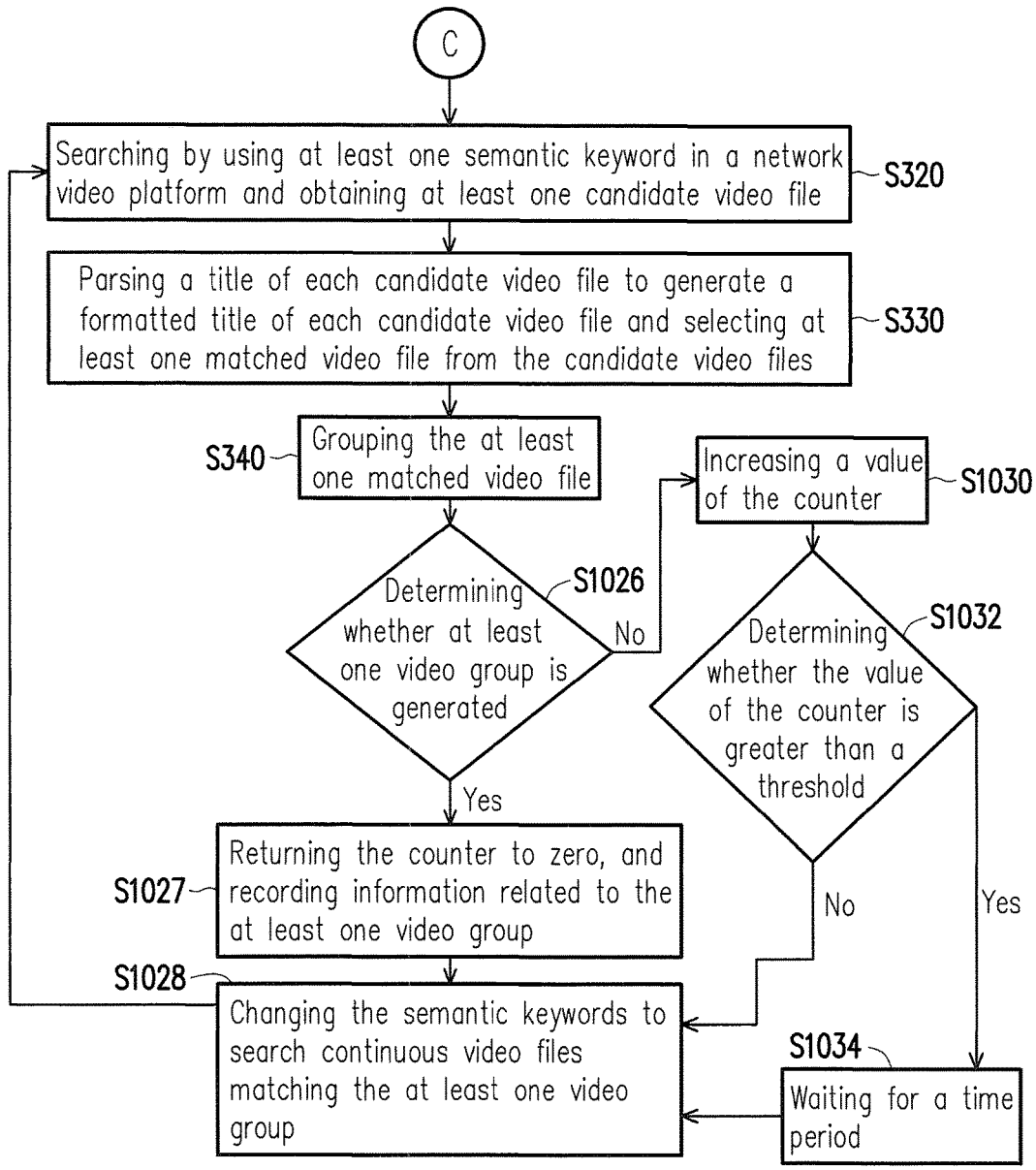

FIG. 10 is a schematic flowchart of collating individual video files in a channel according to categories according to one of the exemplary embodiments of the disclosure. It is to be noted here that FIG. 10 is further divided into FIG. 10A and FIG. 10B in two separate pages with a node C as the connection of the two drawings. With reference to FIG. 10A and FIG. 10B, after step S310 where the video information is retrieved, in step S1012, according to the category information of the video information, whether to determine if the episode information exists in the video information or whether to determine if the date information exists in the video information is decided. In step S1014, whether the episode information of the video information exists in the video information is determined. In step S1016, whether the date information of the video information exists in the video information is determined.

If the episode information is determined as existent in the video information according to the category information, in step S1018, episode information of initiate video information is defined as the episode information of the video information and serves as the episode information of the semantic keywords. If the episode information is determined as inexistent in the video information according to the category information, in step S1020, the episode information of the initiate video information is defined as episode 1 and serves as the episode information of the semantic keywords. If the date information is determined as existent in the video information according to the category information, in step S1022, date information of the initiate video information is defined as the date information of the video information and serves as the date information of the semantic keywords.

If the date information is determined as inexistent in the video information according to the category information, in step S1024, the date information of the initiate video information is defined as the current date and serves as the date information of the semantic keywords. In the present exemplary embodiment, if the category information is the drama category, the initiate video information starts from episode 1, and if the category information is the variety category, the date information of the initiate video information is the date when the method of searching and collating video files is performed. If the episode information or the date information of the currently played video file exists in the video information, the episode information or the date information directly serves as the initiate video information.

Afterward, referring FIG. 10B, step S320 through step S340 are performed. After step S340, in step S1026, whether at least one video group is generated is determined. If yes, in step S1027, the counter is returned to zero, and information related to the at least one video group is recorded, and in step S1028, the semantic keywords are changed to search continuous video files matching the at least one video group, and then, step S320 is returned to. In the present exemplary embodiment, before changing the semantic keywords to search the continuous video files matching the at least one video group, category information of the video information is determined. If the category information of the video information is the drama category, the semantic keywords are changed for searching for the next episode, and if episode 1 is found, the semantic keywords are again changed for searching for episode 2. If the category information of the video information is the variety category, the semantic keywords are changed for searching the previous episode. For example, if a video file of today is found, a video of yesterday is searched. If a variety program is once a week, a week may be a unit, and if a video of today is found, a video file of the same day last week is searched.

Figure 11A:
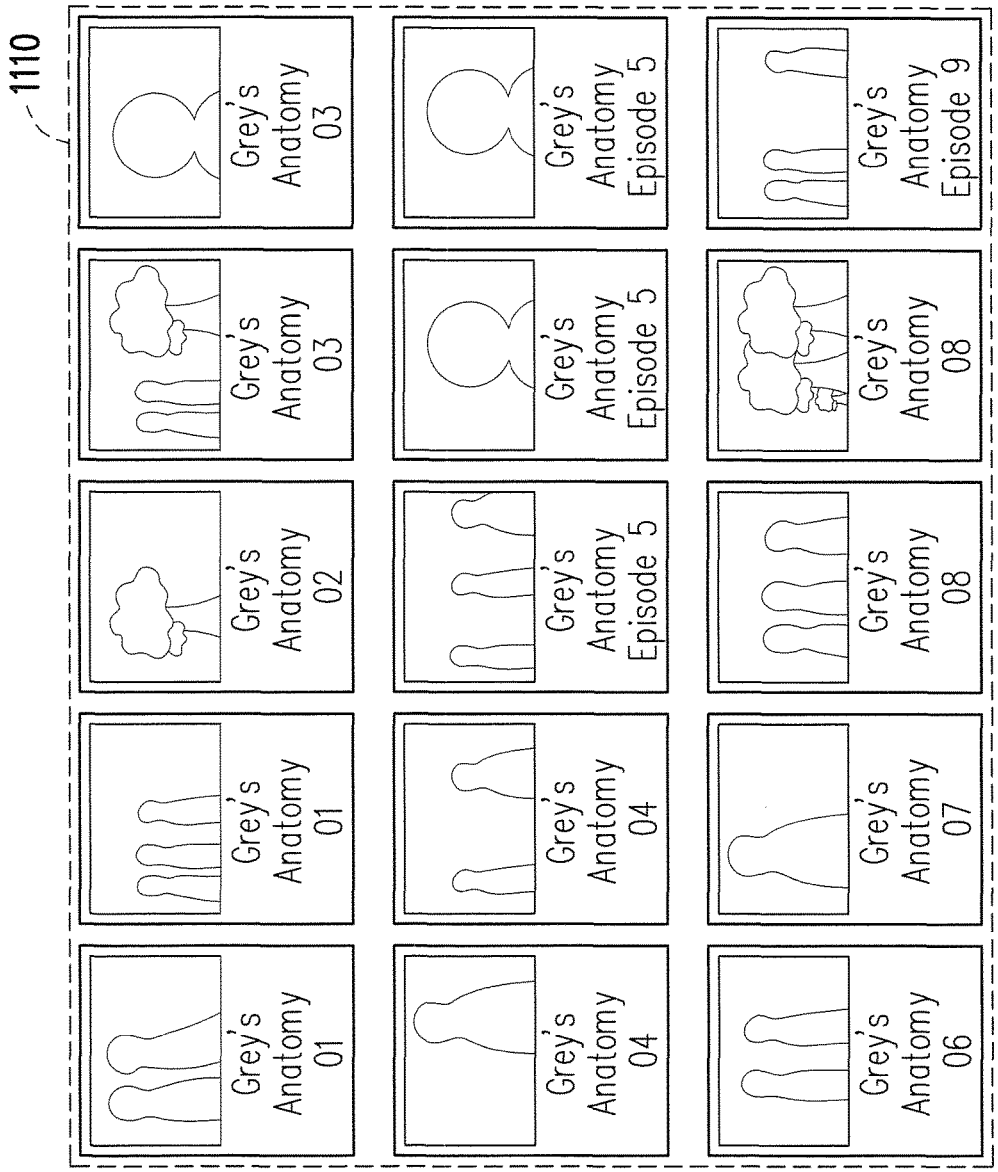
FIG. 11A and FIG. 11B are schematic diagrams of collating individual video files in at least one channel set according to categories according to one of the exemplary embodiments of the disclosure.
Figure 11B:
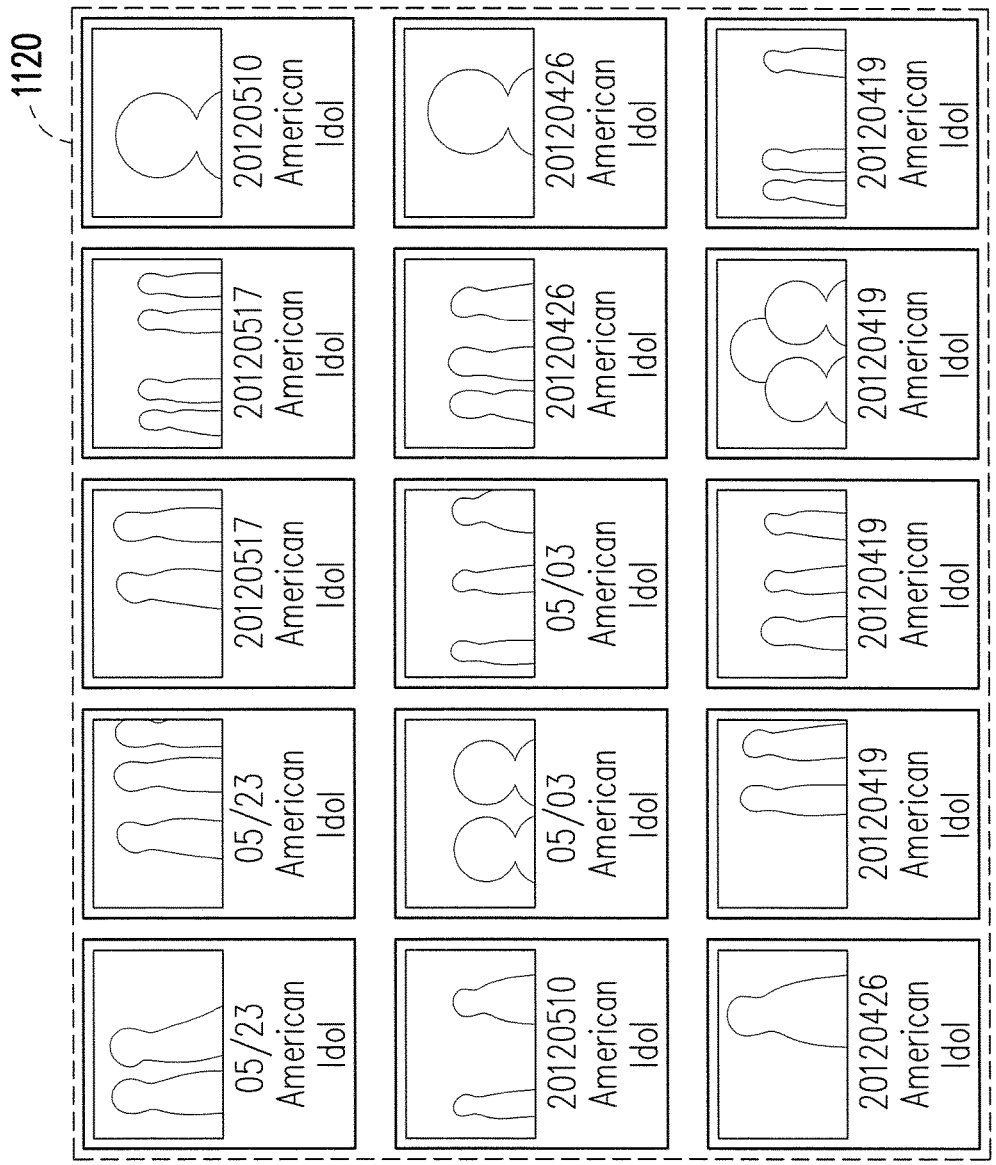

In step S1030, if no video group is generated, a value of the counter is increased, and in step S1032, whether the value of the counter is greater than a threshold is determined. In the value of the counter is not greater than the threshold, in step S1028, the semantic keywords are changed for searching continuous video files matching the at least one video group. If the value of the counter is greater than the threshold, in step S1034, after a time period is waited, the semantic keywords are again changed for searching for continuous video files matching the at least one video group. In the present exemplary embodiment, if the latest video file is episode 9, episode 10 may be waited for a time period to be posted (e.g., a week) on a network video platform. Thus, the video file searching and collating system would change the semantic keyword from including "episode 9" to "episode 10" and continue the searching operation after waiting for a time period. If any is found, the counter is returned to zero, and a whole set of continuous video files are collected to form a channel. FIG. 11A and FIG. 11B are schematic diagrams of collating individual video files in at least one channel set according to categories according to one of the exemplary embodiments of the disclosure. In the present exemplary embodiment, FIG. 11A illustrates a channel set of the drama category 1110, from which it can be seen that a video set of "Grey's Anatomy" is arranged from episode 1, FIG. 11B illustrates a channel set of the variety category 1120, from which it can be seen that a set of the program "American Idol" is arranged with a week as an interval from the latest episode toward earlier episodes.

Figure 12:
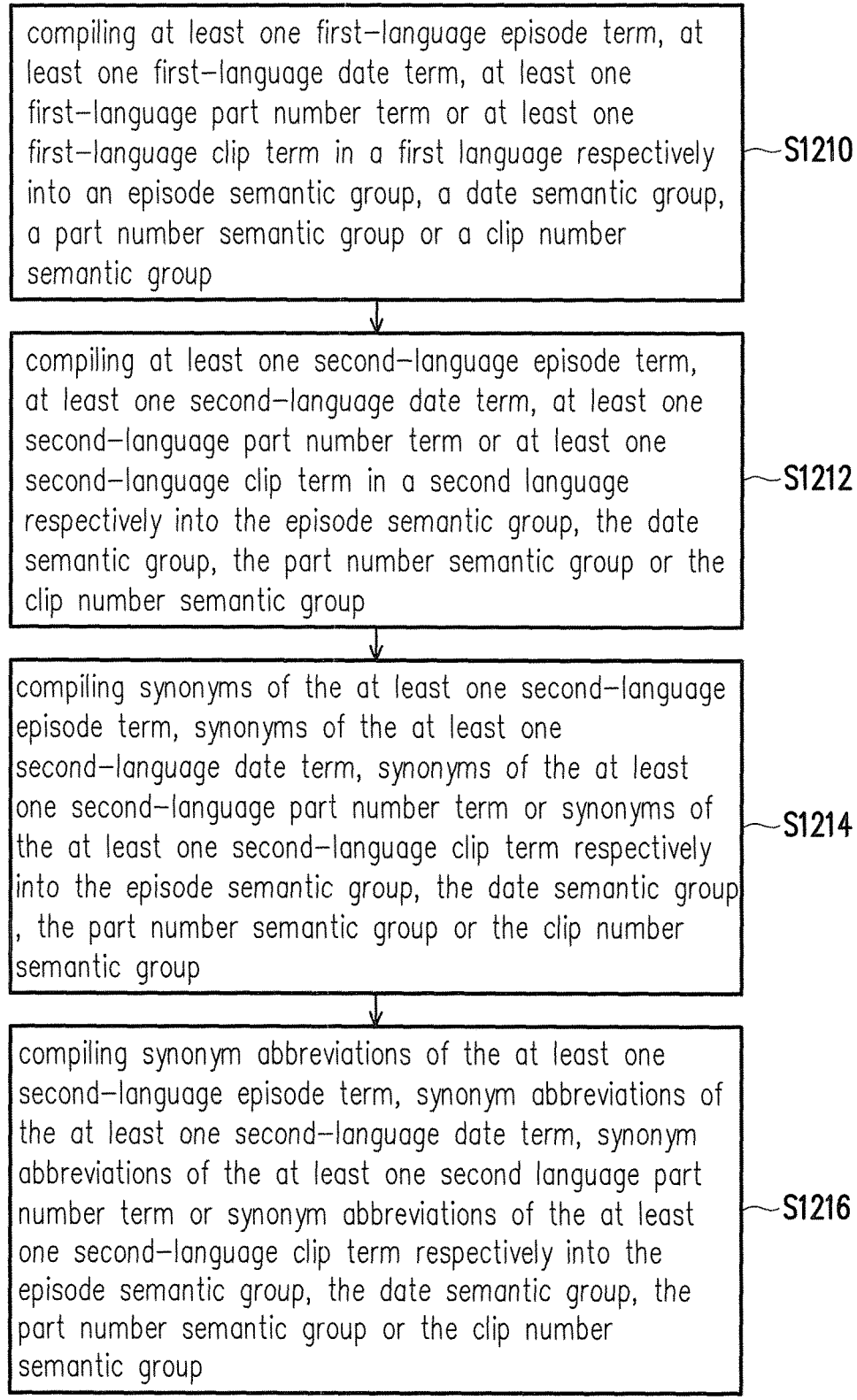
FIG. 12 is a schematic flowchart of compiling semantic groups according to categories according to one of the exemplary embodiments of the disclosure.

FIG. 12 is a schematic flowchart of compiling semantic groups according to categories according to one of the exemplary embodiments of the disclosure. In step S1210, at least one first-language episode term, at least one first language date term, at least one first-language part number term or at least one first-language clip term in a first language is compiled in an episode semantic group, a date semantic group, a part number semantic group or a clip number semantic group. In step S1212, at least one second-language episode term, at least one second-language date term, at least one second-language part number term or at least one second-language clip term is compiled into the episode semantic group, the date semantic group, the part number semantic group or the clip number semantic group, respectively. In step S1214, synonyms of the second-language episode term, synonyms of the second-language date term, synonyms of the second-language part number term or synonyms of the second-language clip term are respectively compiled into the episode semantic group, the date semantic group, the part number semantic group or the clip number semantic group. In the present exemplary embodiment, the first language may be a local language belongs to where the programs are broadcasted and may be transitional Chinese, English, simplified Chinese, Japanese, Spanish, German, which is not limited in the disclosure. The second language may be transitional Chinese, English, simplified Chinese, Japanese, Spanish, German, which is not limited in the disclosure.

In step S1216, synonym abbreviations of the second-language episode term, synonym abbreviations of the second-language date term, synonym abbreviations of the second language part number term or synonym abbreviations of the second-language clip term are respectively compiled into the episode semantic group, the date semantic group, the part number semantic group or the clip number semantic group. Formats of the episode semantic group, the date semantic group, the part number semantic group or the clip number semantic group may be expressed by the regular expressions illustrated in FIG. 6. The semantic groups may be compiled using computer program languages, but the disclosure is not limited thereto.

Figure 13:
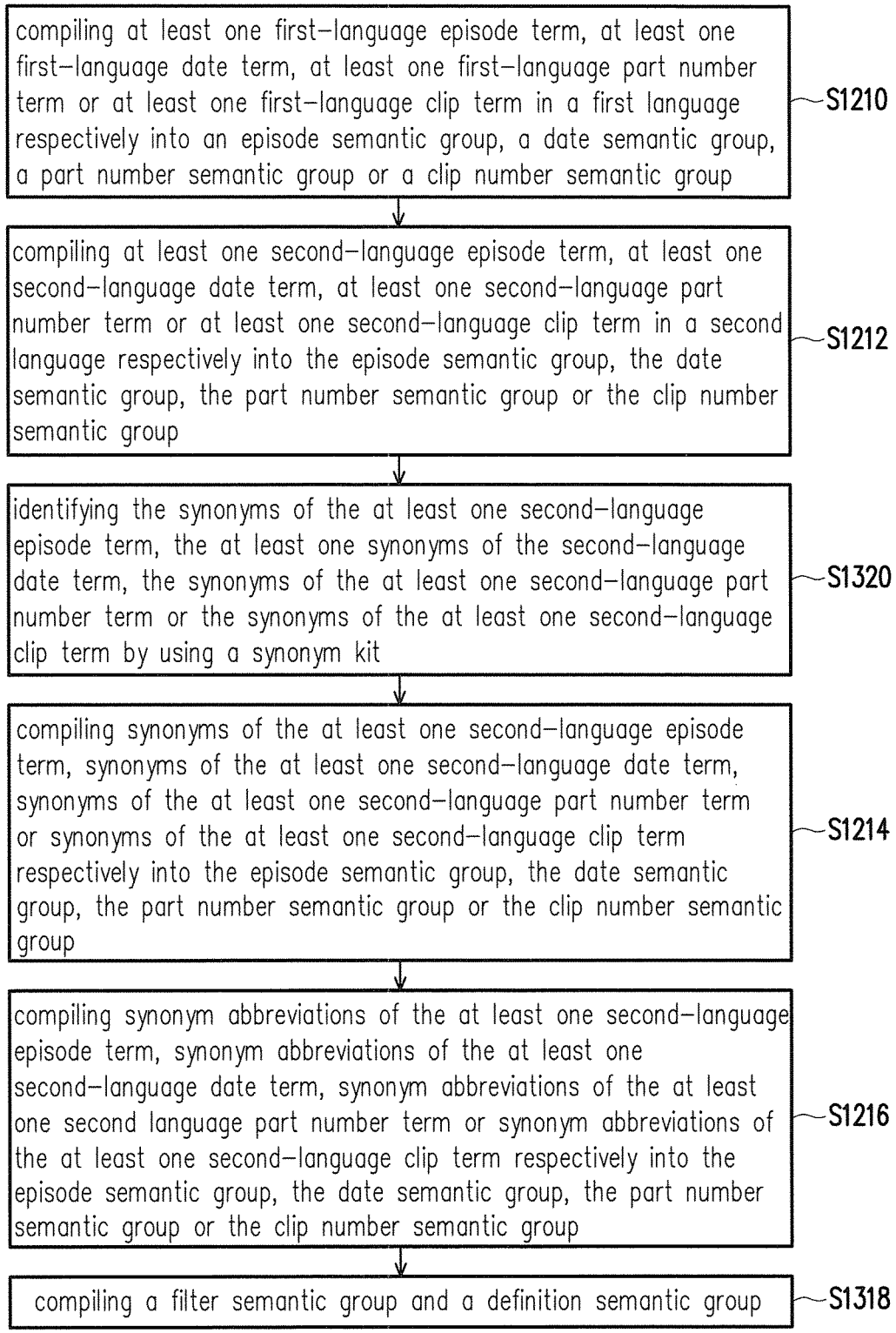
FIG. 13 is a schematic flowchart of compiling semantic groups according to categories according to one of the exemplary embodiments of the disclosure.

FIG. 13 is a schematic flowchart of compiling semantic groups according to categories according to one of the exemplary embodiments of the disclosure. After step S1216 where the synonym abbreviations of the second-language episode term, the synonym abbreviations of the second-language date term, the synonym abbreviations of the second language part number term or the synonym abbreviations of the second-language clip term are respectively compiled into the episode semantic group, the date semantic group, the part number semantic group or the clip number semantic group, in step S1318, a filter semantic group and a definition semantic group are compiled. Before step S1214, step S1320 may be performed to use a synonym kit for searching synonyms of the second-language episode term, synonyms of the second-language date term, synonyms of the second-language part number term or synonyms of the second-language clip term. In the present exemplary embodiment, the synonym kit may be, for example, the website Thesaurus.com (http://thesaurus.com) or any kit for searching synonymous semantics, such as electronic dictionary software, which is not limited in the disclosure. In the present exemplary embodiment, the synonyms may be automatically searched by using a program linking the website Thesaurus.com or may be automatically searched in the electronic dictionary software by using a program, but the disclosure is not limited thereto. In the present exemplary embodiment, the method for compiling the semantic groups may also used to compile semantic groups in three or more languages, which is not limited in the disclosure. In the present exemplary embodiment, semantic groups in multiple languages may be established so as to search multi-language video files. In another exemplary embodiment, a computer storage medium for storing a computer program is configured, and an electronic apparatus may utilize the computer program stored in the computer storage medium to search and collate video files and compile semantic groups.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of searching and collating video files, comprising:
    retrieving a semantic keyword according to video information, wherein the semantic keyword comprises title information;
    searching according to the semantic keyword in a video platform and obtaining a plurality of candidate video files;
    parsing each of the candidate video files by using a video semantic searching and collating process, selecting a plurality of matched video files and grouping the matched video files; and
    gathering the grouped matched video files in at least one video channel set,
    wherein the step of retrieving the semantic keyword according to the video information comprises:
    retrieving the semantic keyword from metadata of the video information or from source information related to the video information,
    if the metadata of the video information comprises a program title and a category, directly parsing the program title and the category in the metadata to serve as the semantic keyword, and
    if the metadata of the video information does not comprise the program title or the category, retrieving the program title and the category corresponding to an electronic program guide (EPG) of the video information through a network according a currently viewed channel number and a current time.

2. The method according to claim 1, wherein the EPG complies with service information (SI) in moving picture experts group-2 (MPEG-2) transport stream.

3. The method according to claim 1, wherein the EPG of the video information is metadata describing program information which is retrieved by using an EPG parser.

4. The method according to claim 1, the video semantic searching and collating process step comprising
    filtering the candidate video files, grouping and collating all of or part of the filtered candidate video files in a set according to the semantic keyword.

5. The method according to claim 4, wherein the video semantic searching and collating process further comprising a program semantic parsing method, the program semantic parsing method filtering the candidate video files by using a filter style so as to filter out the candidate video files matching the filter style; and
    parsing the candidate video files by using a semantic group so as to gather semantics of the candidate video files.

6. The method according to claim 5, wherein the semantic group comprises an episode semantic group, a date semantic group, a clip number semantic group, a definition semantic group or any combination thereof.

7. The method according to claim 4, further comprising a step of performing program semantic search algorithm to combine program title and semantic information as at least one set of searching conditions to search in the candidate video files and obtain the matched video files.

8. The method according to claim 1, wherein the step of gathering the grouped matched video files in the at least one video channel set comprises
    based on program semantic search algorithm, changing semantics to search the matched video files having consecutive episodes to establish the at least one video channel set.

9. The method according to claim 1, further comprising:
    parsing validity for the matched video files of the at least one video channel set after a predetermined time period to divide the matched video files in the at least one video channel set into a valid program sub set and an invalid program sub set.

10. The method according to claim 1, further comprising:
    periodically changing the semantic keyword to search a plurality of updated candidate video files; and
    parsing the updated candidate video files by the video semantic searching and collating process and selecting a plurality of updated matched video files to update the at least one video channel set.

11. The method according to claim 1, further comprising:
    providing the matched video files in the at least one video channel set with a recommended list to select the at least one video channel set.

12. A system of searching and collating video files, comprising:
    a retrieving unit, retrieving a semantic keyword according to video information, wherein the semantic keyword comprises title information;
    a searching unit, searching according to the semantic keyword in a video platform to obtain a plurality of candidate video files; and
    a processing unit, parsing each of the candidate video files by using a video semantic searching and collating process, selecting a plurality of matched video files and grouping the matched video files so as to gather the grouped matched video files in at least one video channel set,
    wherein the retrieving unit retrieves the semantic keyword from a part of metadata of the video information or from source information related to the video information,
        wherein if the metadata of the video information comprises a program title and a category, the program title and the category in the metadata is directly parsed to serve as the semantic keyword, and
    if the metadata of the video information does not comprise the program title and the category, the program title and the category corresponding to the EPG is retrieved through a network according a currently viewed channel number and a current time.

13. The system according to claim 12, wherein the EPG is service information (SI) in transport stream complying with moving picture experts group-2 (MPEG-2) standard.

14. The system according to claim 12, wherein the EPG of the video information is metadata describing program information which is retrieved by using an EPG parser.

15. The system according to claim 12, wherein the processing unit filters the candidate video files by using the video semantic searching and collating process, groups and collates all of or part of the filtered candidate video files in a set according to the semantic keyword.

16. The system according to claim 15, wherein the processing unit performs a program semantic parsing method adopting a filter style to filter the candidate video files so as to filter out the candidate video files matching the filter style and adopting a semantic group parsing semantics of the candidate video files to collect the semantics of the candidate video files.

17. The system according to claim 16, wherein the filter style comprises a universal filter semantic group and a user-defined filter semantic group, wherein
the universal filter semantic group serves to filter part of the candidate video files which have titles comprising program type restriction semantics, and the user-defined filter semantic group serves to filter part of the candidate video files which have titles comprising undesired semantics.

18. The system according to claim 16, wherein the semantic group comprises an episode semantic group, a date semantic group, a clip number semantic group, a definition semantic group or any combination thereof.

19. The system according to claim 15, wherein the processing unit performs program semantic search algorithm to combine program title and semantic information as at least one set of searching conditions to search in the candidate video files and obtain the matched video files.

20. The system according to claim 12, wherein the processing unit gathers the grouped matched video files in the at least one video channel set to be based on program semantic search algorithm, changes semantics to search the matched video files having consecutive episodes to establish the at least one video channel set.

21. The method according to claim 6, further comprising:
compiling at least one first-language episode term, at least one first-language date term, at least one first-language part number term or at least one first-language clip term in a first language respectively into the episode semantic group, the date semantic group, a part number semantic group or the clip number semantic group;
compiling at least one second-language episode term, at least one second-language date term, at least one second-language part number term or at least one second-language clip term in a second language respectively into the episode semantic group, the date semantic group, the part number semantic group or the clip number semantic group;
compiling synonyms of the at least one second-language episode term, synonyms of the at least one second-language date term, synonyms of the at least one second-language part number term or synonyms of the at least one second-language clip term respectively into the episode semantic group, the date semantic group, the part number semantic group or the clip number semantic group; and
compiling synonym abbreviations of the at least one second-language episode term, synonym abbreviations of the at least one second-language date term, synonym abbreviations of the at least one second language part number term or synonym abbreviations of the at least one second-language clip term respectively into the episode semantic group, the date semantic group, the part number semantic group or the clip number semantic group.

22. The method according to claim 21, wherein a format of the episode semantic group, the date semantic group, the part number semantic group or the clip number semantic group is a regular expression.

23. The method according to claim 21, wherein after step of compiling the synonym abbreviations of the at least one second-language episode term, the synonym abbreviations of the at least one second-language date term, the synonym abbreviations of the at least one second language part number term or the synonym abbreviations of the at least one second-language clip term respectively into the episode semantic group, the date semantic group, the part number semantic group or the clip number semantic group, the method further comprises:
compiling a filter semantic group and a definition semantic group.

24. The method according to claim 21, before the step of compiling the synonyms of the at least one second-language episode term, the synonyms of the at least one second-language date term, the synonyms of the at least one second-language part number term or the synonyms of the at least one second-language clip term respectively into the episode semantic group, the method further comprises:
identifying the synonyms of the at least one second-language episode term, the at least one synonyms of the second-language date term, the synonyms of the at least one second-language part number term or the synonyms of the at least one second-language clip term by using a synonym kit.

25. A non-volatile and non-transitory computer storage medium for storing a computer program, which configured for an electronic apparatus to perform a method of searching and collating video files comprising steps of:
retrieving a semantic keyword according to video information, wherein the semantic keyword comprises title information;
searching according to the semantic keyword in a video platform and obtaining a plurality of candidate video files;
parsing each of the candidate video files by using a video semantic searching and collating process, selecting a plurality of matched video files and grouping the matched video files;
gathering the grouped matched video files in at least one video channel set,
compiling at least one first-language episode term, at least one first-language date term, at least one first-language part number term or at least one first-language clip term in a first language respectively into the episode semantic group, the date semantic group, a part number semantic group or the clip number semantic group;
compiling at least one second-language episode term, at least one second-language date term, at least one second-language part number term or at least one second-language clip term in a second language respectively into the episode semantic group, the date semantic group, the part number semantic group or the clip number semantic group;
compiling synonyms of the at least one second-language episode term, synonyms of the at least one second-language date term, synonyms of the at least one second-language part number term or synonyms of the at least one second-language clip term respectively into the episode semantic group, the date semantic group, the part number semantic group or the clip number semantic group; and
compiling synonym abbreviations of the at least one second-language episode term, synonym abbreviations of the at least one second-language date term, synonym abbreviations of the at least one second language part number term or synonym abbreviations of the at least one second-language clip term respectively into the episode semantic group, the date semantic group, the part number semantic group or the clip number semantic group.

* * * * *